(12) United States Patent
Yang et al.

(10) Patent No.: US 6,834,122 B2
(45) Date of Patent: Dec. 21, 2004

(54) VISUALIZATION AND PROCESSING OF MULTIDIMENSIONAL DATA USING PREFILTERING AND SORTING CRITERIA

(75) Inventors: Mary M. Yang, San Diego, CA (US); Edward J. Bylina, San Diego, CA (US); William J. Coleman, San Diego, CA (US); Michael R. Dilworth, Santa Cruz, CA (US); Steven J. Robles, San Diego, CA (US); Douglas C. Youvan, San Diego, CA (US)

(73) Assignee: Kairos Scientific, Inc., San Diego, CA (US)

(*) Notice: Subject to any disclaimer, the term of this patent is extended or adjusted under 35 U.S.C. 154(b) by 717 days.

(21) Appl. No.: 09/767,595

(22) Filed: Jan. 22, 2001

(65) Prior Publication Data

US 2001/0036304 A1 Nov. 1, 2001

Related U.S. Application Data

(60) Provisional application No. 60/177,575, filed on Jan. 22, 2000, and provisional application No. 60/186,034, filed on Mar. 1, 2000.

(51) Int. Cl.[7] .................................................. G06K 9/68
(52) U.S. Cl. ........................ 382/227; 382/260; 356/303; 707/7
(58) Field of Search ................................ 382/100, 128, 382/129, 130, 132, 191, 201, 210, 226, 227, 260, 261, 262, 263, 264, 265; 707/7, 104.1; 356/303, 939, 319, 326, 300

(56) References Cited

U.S. PATENT DOCUMENTS

| | | | | |
|---|---|---|---|---|
| 5,784,162 A | * | 7/1998 | Cabib et al. | 356/456 |
| 5,914,245 A | * | 6/1999 | Bylina et al. | 435/19 |
| 6,005,256 A | * | 12/1999 | McGlynn et al. | 250/559.4 |
| 6,456,734 B1 | * | 9/2002 | Youvan et al. | 382/128 |
| 6,577,956 B1 | * | 6/2003 | Shams | 702/19 |

FOREIGN PATENT DOCUMENTS

| | | |
|---|---|---|
| EP | 0 496 345 A1 | 7/1992 |
| WO | WO 99/35496 | 7/1999 |

OTHER PUBLICATIONS

Advertisement entitled "Evolve into something powerful," *Nature biotechnology*, 17(4), Apr. 1999.

(List continued on next page.)

*Primary Examiner*—Samir Ahmed
*Assistant Examiner*—Anand Bhatnagar
(74) *Attorney, Agent, or Firm*—Fenwick & West LLP; Michael J. Shuster

(57) ABSTRACT

Complex multidimensional datasets generated by digital imaging spectroscopy can be organized and analyzed by applying software and computer-based methods comprising sorting algorithms. Combinations of these algorithms to images and graphical data, allow pixels or features to be rapidly and efficiently classified into meaningful groups according to defined criteria. Multiple rounds of pixel or feature selection may be performed based on independent sorting criteria. In one embodiment sorting by spectral criteria (e.g., intensity at a given wavelength) is combined with sorting by temporal criteria (e.g., absorbance at a given time) to identify microcolonies of recombinant organisms harboring mutated genes encoding enzymes having desirable kinetic attributes and substrate specificity. Restriction of the set of pixels analyzed in a subsequent sort based on criteria applied in an earlier sort ("sort and lock" analyses) minimize computational and storage resources. User-defined criteria can also be incorporated into the sorting process by means of a graphical user interface that comprises a visualization tools including a contour plot, a sorting bar and a grouping bar, an image window, and a plot window that allow run-time interactive identification of pixels or features meeting one or more criteria, and display of their associated spectral or kinetic data. These methods are useful for extracting information from imaging data in applications ranging from biology and medicine to remote sensing.

22 Claims, 19 Drawing Sheets

(17 of 19 Drawing Sheet(s) Filed in Color)

OTHER PUBLICATIONS

Advertisement entitled "Evolve into something powerful," *Chemical*, Oct. 19, 1998.

Advertisement entitled "Evolve into something powerful," *Chemical & Engineering News*, Mar. 29, 1999.

Caldwell et al., "Imaging of Bacterial Cells by Fluorescence Exclusion Using Scanning Confocal Laser Microscopy," *Microbiological Methods*; vol. 15(4), p. 249–261, (1992) (Abstract).

Cover Figure, *Current Opinion in Microbiology*, 2(3), Jun. 1999.

Fox, Jeffrey L., "Hercules and Kairos catalyze enzyme deal,", *Nature Biotechnology*, 17(5), p. 417, May 1999.

Hercules Incorporated News Release, Hercules Establishes Partnership with Kairos Scientific, 99–5–C, Mar. 10, 1999.

"Hercules licenses Kairos biocatalysis technology," *Chemical & Engineering News*, p. 12, Mar. 22, 1999.

International Search Report mailed Jan. 28, 2002, International Application No. PCT US 01/07235.

"Kairos' kCAT Service" web posting to Kairos Scientific web page on Aug. 4, 1998.

"News—Collaborations & Agreements," *Genetic Engineering News*, 19(7), Apr. 1, 1999.

Reisch, Marc S., "A Modern–Day Hercules Bulks Up," *Chemical Engineering News*, pp. 13–15, Apr. 5, 1999.

Weaver et al., "A General Method for Separating Cells by Function and Composition," *Methods (San Diego*, vol. 2(3), pp. 234–247, (1991) (Abstract).

Written Opinion, mailed Jun. 26, 2001, International Application No. PCT US/99/13824.

Yahoo Finance Web Site Press Release "Hercules Establishes Partnership with Kairos Scientific," Mar. 12, 1999.

Yang, M.M.,et al., "Applications of Imaging Spectroscopy in Molecular Biology: I. Screening Photosynthetic Bacteria," *Biotechnology*, 6:8, (Aug. 1988), pp. 939–942.

Youvan, Douglas C., "Imaging Spectroscopy and Solid Phase Screening," IBC World Congress on Enzyme Technologies, Mar. 10–12, 1999, San Francisco, California.

Boardman, et al., "Automated Spectral Analysis: A Geological Example Using Aviris Data, North Grapevine Mountains, Nevada," Proceedings of the Tenth Thematic Conference re Geologic Remote Sensing, vol. 1, May 9–12, 1994, San Antonio, TX, pp. I–407–I418.

Green, Andrew, et al., "A Transformation for Ordering Multispectral Data in Terms of Image Quality with Implications for Noise Removal," IEEE Transactions on Geoscience and Remote Sensing, vol. 26, No. 1, Jan. 1988, pp. 65–74.

Yang, M.M., et al., "High Resolution Imaging Microscope (HIRIM)", *Biotechnology et alia*, ISSN 1532–5474 (1998) 4:1–20, XP002186904.

Yang, M.M., et al., "Graphical User Interface for single–pixel spectroscopy," *Biotechnology et alia*, ISSN 1532–5474 (Sep. 8, 2000) 5:1–8, XP002186905.

* cited by examiner

VISUALIZATION AND PROCESSING OF MULTIDIMENSIONAL DATA USING PREFILTERING AND SORTING CRITERIA

RELATED APPLICATION DATA

This application claims the benefit of U.S. Provisional Application Ser. No. 60/177,575, filed Jan. 22, 2000 and U.S. Provisional Application Ser. No. 60/186,034, filed Mar. 1, 2000, the entire disclosures of which are hereby incorporated by reference in their entirety.

FIELD OF THE INVENTION

The current invention relates generally to the visualization and processing of multidimensional data, and in particular, to data formed from a series of images.

BACKGROUND OF THE INVENTION

Sophisticated analysis of imaging data requires software that can rapidly identify meaningful regions of the image. Depending on the size and number of regions, this process may require evaluating very large datasets, and thus efficient sorting of the data is essential for finding the desirable elements. In the present invention, regions of interest (ROIs) in previous feature-based imaging spectroscopy are extended to include pixel-based analyses. This requires new algorithms, since the size of a pixel-based analysis can be more than 1000 times larger than that of a feature-based analysis. In addition to requiring a burdensome amount of processing time, prior art sorting algorithms that may have been adequate to categorize and classify relatively noiseless feature data are not necessarily successful in sorting single-pixel spectra without additional parameters or human intervention.

In cases in which human intervention is advantageous, the present invention includes a means for combining machine and human intelligence to enhance image analysis. For example, the present invention provides a method for combining sorting by spectral criteria (e.g., intensity at a given wavelength) and sorting by temporal criteria (e.g., absorbance at a given time). Sorting enables the user to classify large amounts of data into meaningful and manageable groups according to defined criteria. The present invention also allows for multiple rounds of pixel or feature selection based on independent sorting criteria. Methods are presented for extracting useful information by combining the analyses of multiple datasets and datatypes (e.g., absorbance, fluorescence, or time), such as those obtained using the instruments and methods disclosed in U.S. Pat. Nos. 5,859,700 and 5,914,245, and in U.S. patent application Ser. No. 09/092,316.

The methods described herein are useful for a number of applications in biology, chemistry and medicine. Biomedical applications include high-throughput screening (e.g., pharmaceutical screening) and medical imaging and diagnostics (e.g., oximetry or retinal examination). Biological targets include live or dead biological cells (e.g., bacterial colonies or tissue samples), as well as cell extracts, DNA or protein samples, and the like. Sample formats for presenting the targets include microplates and other miniaturized assay plates, membranes, electrophoresis gels, microarrays, macroarrays, capillaries, beads and particles, gel microdroplets, microfluidic chips and other microchips, and compact discs. More generally, the methods of the present invention can be used for analysis of polymers, optical materials, electronic components, thin films, coatings, combinatorial chemical libraries, paper, food, packaging, textiles, water quality, mineralogy, printing and lithography, artwork, documents, remote sensing data, computer graphics and databases, or any other endeavor or field of study that generates multidimensional data.

SUMMARY OF THE INVENTION

The present invention provides methods, systems and computer programs for analyzing and visualizing multidimensional data. Typically, the first two dimensions are spatial and the third dimension is either spectral or temporal. (Although the term spectra or kinetics may be used herein, the methods described are of general applicability to both forms of vector data.) The invention includes a graphical user interface and method that allows for the analyses of multiple data types. For example, datastacks of fluorescence emission intensity, absorbance, reflectance and kinetics (changes in signal over time) can be analyzed either independently or on the same sample for the same field of view. Fluorescence measurements involving fluorescence resonance energy transfer (FRET) can also be analyzed. A key feature of the present invention is that data analysis can be performed in series. Thus, for example, the results of sorting pixels or features within one image stack can be applied to subsequent sorts within image stacks. The present invention also includes methods to prefilter data. Thus, for example, pixel-based analysis can be performed, wherein features are selected based on particular criteria and a subsequent sort is restricted to pixels that lie within the selected features. These sorting methods are guided by the heuristics of parameters input by the user. This is especially beneficial when expert knowledge is available. Thus, for example, the user can select a particular spectrum with desirable characteristics (a target spectrum) from a spectral stack, and the program will automatically classify all of the spectra obtained from the image stack by comparing each of the unclassified spectra to the target spectrum, calculating a distance measure, and sorting the spectra based on their distance measure. The classified (sorted) spectra are then displayed in the contour plot window or other plot windows.

Sorting can also be used for sequentially analyzing images and graphical data, such that the pixels that are ultimately displayed are restricted by at least two independent criteria. For example, pixels or features that have been extracted based on selected spectral criteria (e.g., absorbance) can be further analyzed based on temporal criteria (e.g., kinetics). This method of combined analysis provides a means for rapidly and efficiently extracting useful information from massive amounts of data. A further embodiment of sequential sorting involves discarding unwanted data during the sorting process. This 'sort and lock' procedure provides a useful new tool for data compression. This method for sorting and displaying multidimensional data from an image stack comprises the steps of: (a) selecting a subset of pixels from an image by a first algorithm; (b) discarding the pixels that are not selected; (c) selecting a subset of the remaining pixels by a second sorting algorithm; and (d) automatically indicating the final selection of pixels by back-coloring the corresponding pixels in the image. This type of multidimensional analysis can also be performed by manipulating the contour plot window. The method comprises the steps of (a) sorting the pixels by a first algorithm; (b) automatically indicating on the contour plot pixels sorted by the first algorithm; (c) selecting a subset of pixels in the contour plot; (d) sorting the subset of pixels by applying a second algorithm; (e) selecting a reduced subset of pixels in the contour plot; and (f) automatically indicating the final selection of pixels by backcoloring the reduced subset of pixels in the image. The present invention also provides a method for displaying a grouping bar that can be used to analyze images and graphical data within the graphical user interface ("GUI"). The grouping bar enables the user to segregate groups of pixels or features within a contour plot, and thereby facilitates independent sorting and backcoloring of the individual groups of pixels or features in the image. The methods of the present invention are applicable to a variety of problems involving complex, multidimensional, or gigapixel imaging tasks, including (for example) automated screening of genetic libraries expressing enzyme variants.

According to one embodiment of the invention, a method for analyzing digital image data is provided, said method comprising (a) loading into a computer memory a plurality of data stacks wherein each data stack comprises pixel intensity data for a plurality of images, the pixel intensity data expressed as a function of: (i) pixel position, (ii) a first non-positional variable, and (iii) a second non-positional variable, wherein within a data stack, the value of the first non-positional variable is not constant and the value of the second non-positional variable is constant, and wherein between data stacks, the value of the second non-positional variable differs; (b) generating for a plurality of pixels within a first data stack, a plurality of first functions that relate pixel intensity to the first non-positional variable; (c) sorting the pixels within the first stack according to a first value obtained by applying a mathematical operation to the first functions generated for the plurality of pixels; (d) selecting a first set of sorted pixels; (e) generating for a plurality of pixels within the first set, a plurality of second functions that relate pixel intensity to the second non-positional variable; and (f) sorting the pixels within the first set according to a second value obtained by applying a second mathematical operation to the second functions generated for the plurality of pixels within the first set. The non-positional variables may be selected from a wide range of different parameter types that indicate, e.g., the time the data were captured, or, e.g., a condition such as wavelength, temperature, pH, chemical activity (such as, e.g., the concentration of an enzyme substrate or enzyme inhibitor, or the concentration of a drug or other chemical component), pressure, partial pressure of a gaseous chemical, or ionic strength, etc. under which the data were captured.

According to another embodiment, the invention provides a graphical user interface ("GUI") for display and analysis of digital image data comprising (a) a reference window for displaying a reference image comprising pixels; (b) a contour plot window for indicating pixel location along a first dimension, indicating a non-positional variable (such as, e.g., time, wavelength, temperature, pH, chemical activity, pressure, partial pressure of a gaseous chemical, or ionic strength, etc.) along a second dimension, and indicating pixel intensity by a variable signal appearing along the second dimension, said contour plot window further comprising (i) a grouping bar for grouping together pixels for analysis,: and (ii) a selection bar for selecting pixels that are thereby indicated in the reference window and plotted in the plot window; (c) a plot window for displaying a plot of pixel intensity as a function of the non-positional variable.

BRIEF DESCRIPTION OF THE DRAWINGS

The file of this patent contains at least one drawing executed in color. copies of this patent with color drawing(s) will be provided by the Patent and Trademark Office upon request and payment of the necessary fee.

DETAILED DESCRIPTION OF THE INVENTION

Unless otherwise defined, all technical and scientific terms used herein have the same meaning as commonly understood by one of ordinary skill in the art to which this invention belongs. Although methods and materials similar or equivalent to those described herein can be used in the practice and testing of the present invention, suitable methods and materials are described below.

All publications, patent applications, patents, and other references mentioned herein are incorporated by reference in their entirety. In case of conflict, the present application, including definitions, will control. In addition, the materials, methods, and examples described herein are illustrative only and not intended to be limiting.

Other features and advantages of the invention will be apparent from the following detailed description, the drawings, and from the claims.

Layout of the Graphical User Interface

Figure 1:
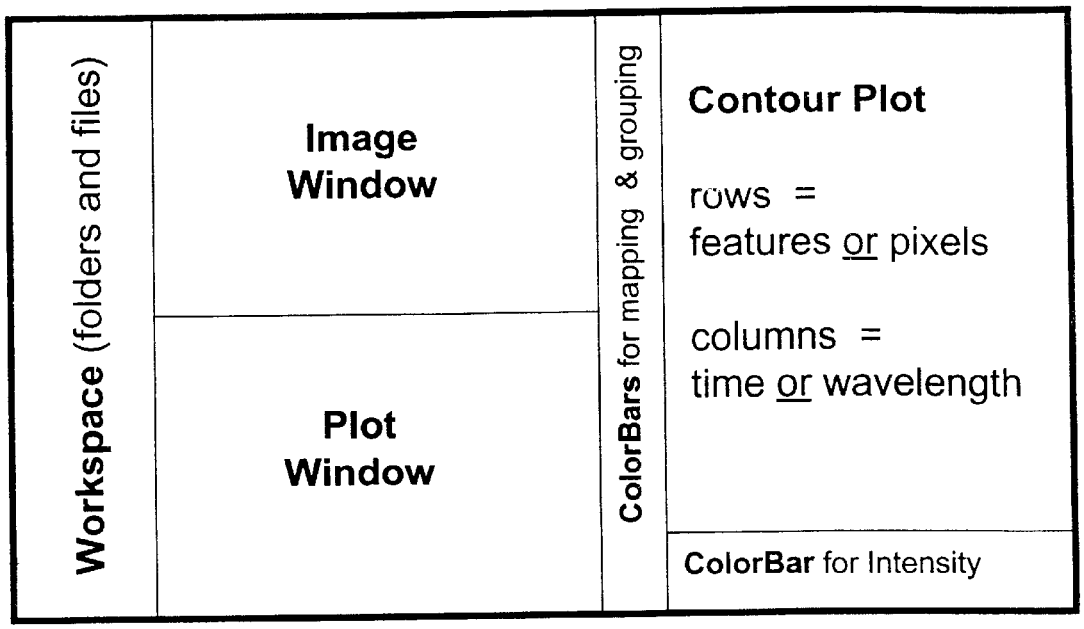
FIG. 1 illustrates the graphical user interface. This GUI utilizes coordinately-controlled windows that are interactive in run-time. Note that in subsequent figures there are two vertical color bars and one horizontal color bar. The horizontal bar under the contour plot provides a color-coded scale for the variable (e.g. spectra or kinetics) plotted within the contour plot. There are two vertical color bars to the left of the contour plot. These two bars are separated by a vertical black line. The first vertical bar immediately to the left of the contour plot is a selection/mapping bar that is used to indicate rows that have been mapped or back-colored onto the image. The second vertical bar is a grouping bar that is used to delineate or segregate rows into user-defined groups of spectra or kinetics data. By default, the entire contour plot is equivalent to one group and in this case, the grouping bar is not shown. Likewise, if nothing had been selected or mapped onto the image, the selection/mapping bar would not be seen.

The graphical user interface ("GUI") is diagrammed in FIG. 1. As shown, this GUI comprises four main interactive windows: Workspace, Image, Plot, and Contour. The workspace window has a look and feel similar to the Microsoft Windows Explorer, and it is used to organize and access projects and files. Typically, a project contains at least one stack of images (a datastack) taken under conditions in which a spectral or temporal variable is incremented by wavelength or time, respectively. Note that while in some embodiments, a small finite amount of time is required to acquire data over a range of wavelengths, for purposes of analysis, this change in time usually may be considered negligible when compared to the amount of time elapsing between time points used to generate a kinetic analysis. Thus, under these circumstances, the temporal parameter can be considered constant within a spectral datastack. Furthermore, the temporal parameter recorded for the data stack may be the actual time of data acquisition, elapsed run time at data acquisition, or any other parameter that relates the captured data to its time of capture. Each of these different examples of a temporal parameter is intended to be encompassed by the phrase "is proportional to the time of data capture." Similarly, in practice, there frequently is a finite range of wavelengths that are generated by even so called "monochromatic" light sources and/or selected by spectral analyzers (i.e. any device used to select or transmit a wavelength or a range of wavelengths). Notwithstanding this spread, a single value of wavelength can, in practice, be assigned to data collected under a particular condition. Choices for this value can include the mean of the range, the median of the range, or an energy-weighted average of the various wavelength components selected or transmitted by the spectral analyzer, or generated by a "monochromatic" light source. Each project can be identified with a single experiment, sample, or mode of data acquisition. In the latter case, Kairos imaging spectrophotometers can be used to acquire absorption and fluorescence spectra or kinetics (e.g., changes in absorbance or fluorescence over time), for the same sample. In enzyme kinetics studies, both absorbance and kinetic data for a particular target (such as an assay disk covered with microcolonies) can be acquired. This type of data can be acquired by the Kairos MicroColonyImager (MCI) which is part of the "Kcat Technology" for enzyme screening. These datatypes represent different datastacks and can be stored in separate projects, which facilitates the simultaneous or combined analysis of fluorescence, absorption and/or kinetics for every pixel in the scene.

Figure 2:
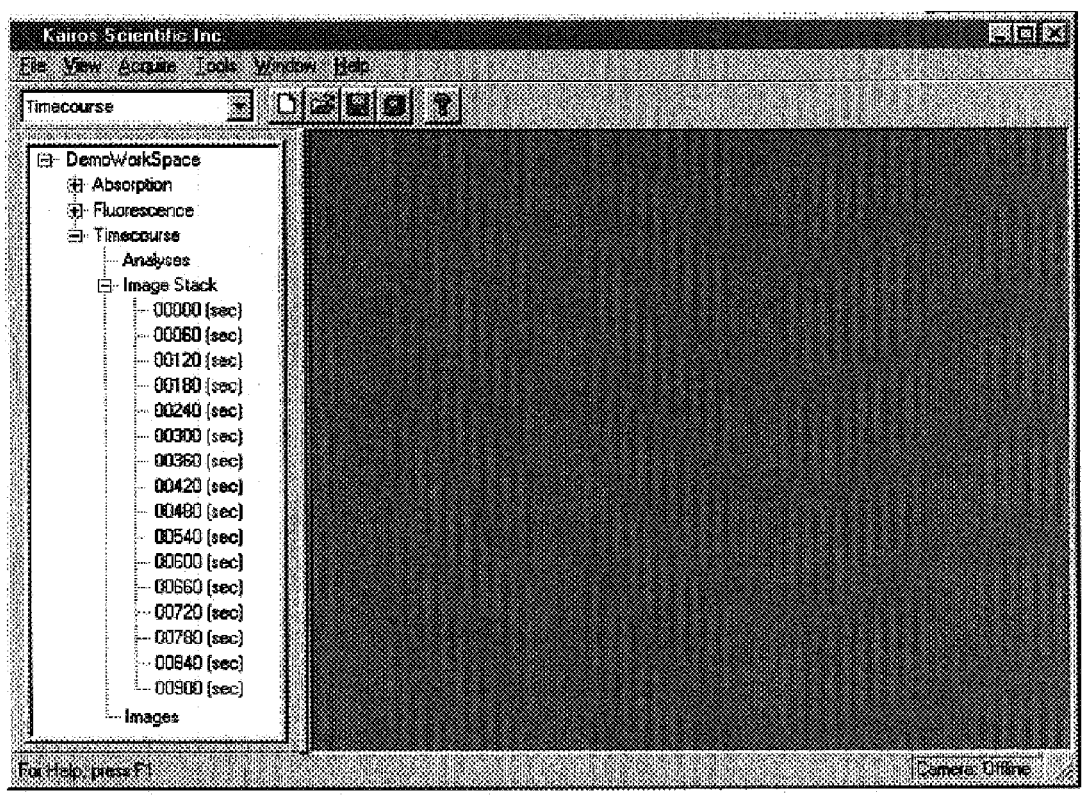
FIG. 2 shows a workspace window demonstrating the layout of multiple projects containing absorption, fluorescence, and kinetic data. The individual timepoint images are shown for the kinetics Image Stack. In a spectral datastack (not shown), the individual timepoint images are replaced by images taken under specific wavelength conditions.

The layout of a typical Kcat display configuration is shown in FIG. 1. In FIG. 2, a workspace containing three different projects: absorption, fluorescence, and kinetics is demonstrated. The kinetics image stack has been opened to show the individual timepoint images. For an absorption datastack, the timepoint images would be replaced by images taken at specific wavelengths.

Each project in the workspace may contain one or more analysis files, which contain data calculated as a function of the non-spatial dimension in the image stacks. Each one of these data vectors corresponds to a row in the contour. When the non-spatial variable is wavelength, the vector is referred to as a spectrum. When this variable is time, the vector is commonly referred to as velocity or a kinetic trace. Although the terms "spectrum" and "kinetics" are used in the description of the present invention, it must be noted that the methods are of general applicability to both forms of graphical data. Three interactive windows, consisting of a reference image, a contour plot and conventional plot window, are displayed. The results of a given analysis can be saved and used in subsequent data processing after the file is reopened. This stored information is referred to as a template, and it includes resultant sorts of the contour plot and pixel groupings which can later be applied to the same datastack or to alternative datastacks.

Figure 3:
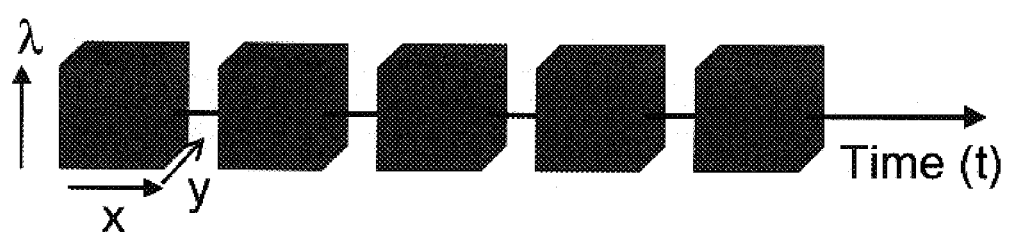
FIG. 3 shows a graphical representation of four dimensional data, including 2 spatial dimensions (x and y), a temporal dimension (t), and a spectral parameter (e.g., wavelength, lambda).

The image stack category accommodates multiple image stacks. Data can be calculated from a raw image stack or pre-processed image stacks. Pre-processing can include a simple division or subtraction to correct for background, or more involved processing to correct for spectral overlap exhibited by multiple fluorescent dyes in an imaged sample. In kinetic experiments, it is useful to divide all images in the stack by the time zero image. A flat field correction may also be used. This algorithm corrects for background and restricts the grayvalue range of the processed image. This is done by using a background image which has previously been divided by its average grayvalue. With large image files, it may be beneficial to perform a prefiltering step which creates a smaller image stack consisting of subsets of regions of interest in the larger image. For example, this subset may comprise a collage of microcolonies satisfying a particular criterion. Such preprocessing has the advantage of concisely displaying rare positive microcolonies while significantly reducing computation time and file storage space requirements. In certain experiments, it is also possible to simultaneously acquire multiple datastacks representing different wavelengths for the same timepoint or multiple timepoints for the same wavelength. This four dimensional data concept is illustrated in FIG. 3. Using this concept, arithmetic processing of image stacks acquired under different wavelength conditions can be used to correct for spectral overlap exhibited by multiple fluorescent dyes in an imaged sample prior to an analysis.

The image category is used to store images that are not necessarily part of the stack. These images can be unprocessed monochrome images acquired under special experimental conditions, or they can be image-processed monochrome or RGB pseudocolored images. Any images in the workspace can be used as a reference image in an analysis.

The stack and image computation described here can be menu driven or incorporated into a wizard, or incorporated into firmware.

Figure 4:
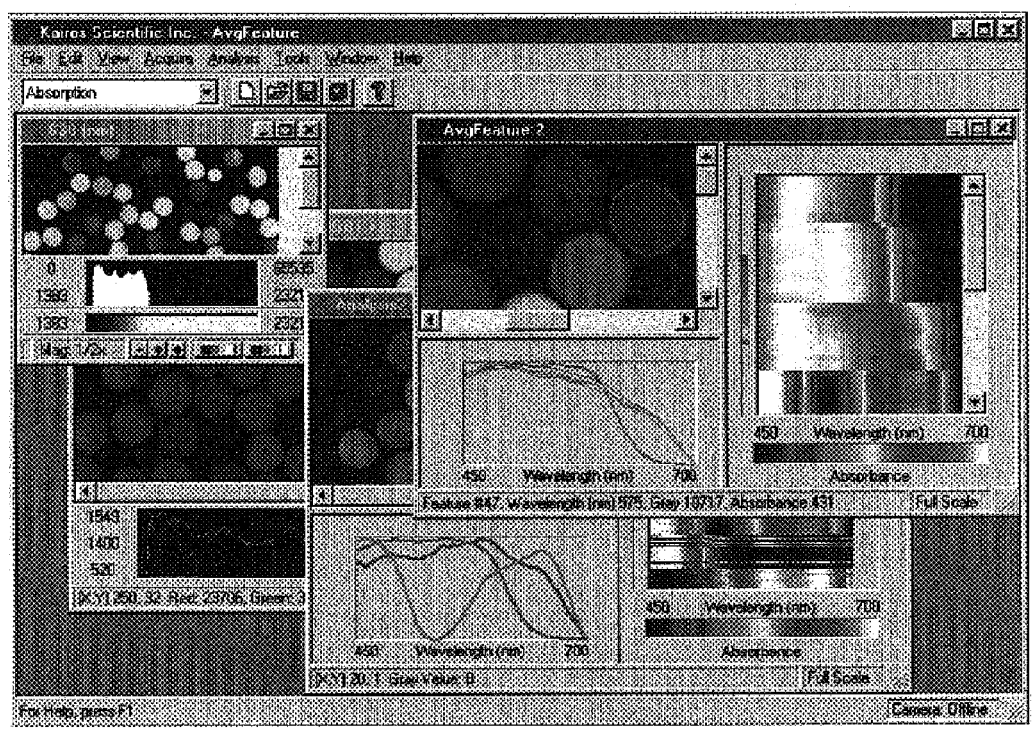
FIG. 4 shows a user interface which demonstrates the ability of the software to display multiple windows.

The workspace window has been hidden in FIG. 4. Instead, multiple windows are shown which demonstrate various display capabilities of the software. Images can be displayed in color or monochrome and in various magnifications. Data obtained from a stack of images can be converted into graphical form and displayed in the plot window. Plots in the plot window can be shown as individual traces or as averages of a selection or group. This is accomplished using user-defined linewidths and colors. In the main application window, the main menu items, a list box, toolbar, and status bar are shown.

The contour plot is a convenient visualization tool for concisely displaying three-dimensional data on a two-dimensional screen. Each thin row in the contour plot represents the data for a particular pixel or feature. The x-axis represents wavelength (for spectral data) or time (for kinetics data). Thus, each wavelength or time point is represented by a discrete column in the contour plot. Of course, this arrangement can be altered without departing from the scope of the invention, as by, e.g., rotating the contour plot through 90 degrees so that each row represents wavelength or time, and each column represents the data for a particular pixel or feature. The intensity of the measured signal (e.g., absorbance) at a given wavelength or time point is indicated by a color code, whose scale is depicted at the bottom of the contour plot window. Black/blue color indicates no/low absorbance and red/white indicates high/maximum absorbance. Thus, for spectral data, the spectrum of a given pixel or feature having a single absorption maximum may be represented by a row in the contour plot which has a white or red segment within the column corresponding to the wavelength of maximum absorption. This absorption maximum is flanked by other colors representing progressively decreasing absorbance. Absorption, reflectance, or fluorescence data can be displayed for every pixel or feature in a scene. As those skilled in the art will readily appreciate, many alternatives to the above-described color code may be used to represent the intensity of the measured signal such as intensity variation (i.e., brighter or lighter regions along the contour plot row), and variations in any other type of visually distinguishable display variation such as stippling, cross-hatching patterns, or any other plotting symbol that can be related to signal intensity in a manner analogous to the exemplified color bar. When the pixels or features are sorted, the various rows are re-ordered from top to bottom in the contour plot window. Thus, sorting tends to create more easily recognized groupings of pixels or features.

Single Pixel Versus Blob Analysis

Figure 5:
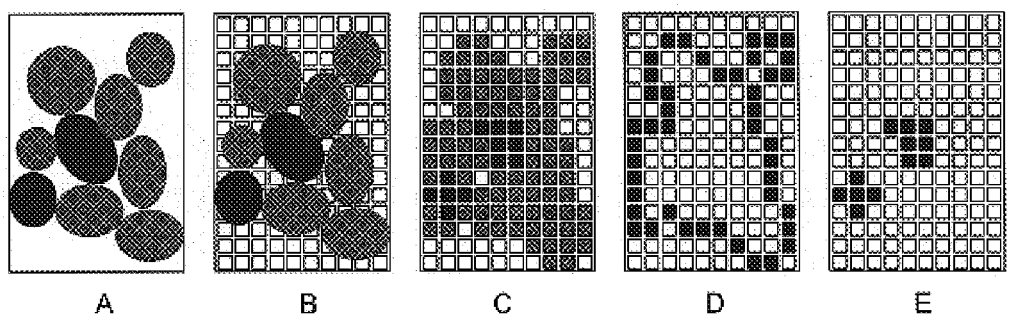
FIG. 5 shows why picking a 'positive' (pixel or feature) is best done by pixel-based rather than by feature-based analysis. For example, in complex images such as confluent groups of microcolonies (Panel A), feature extraction (Panel D) is inferior to single-pixel analysis (Panel E) for identification of the 'fastest' colonies (represented in black) because of edge effects and other artifacts. This effect becomes more apparent as the features within a target become smaller and approach the apparent pixel size, i.e., each feature in Panel B covers only a few pixels and appears as a single 'blob' (Panel C) if it is processed based on feature extraction.

Using the GUI diagrammed above, pixels can be grouped into features by conventional image processing techniques, and all four of the windows within the GUI then act to coordinate feature-based (rather than pixel-based) information. While feature-based analysis can increase the signal-to-noise ratio in certain low-light applications, we find feature extraction to be inferior to pixel-based analysis in many applications. This is due largely to problems associated with separating neighboring pixels into different features that may be adjacent or overlapping. Another reason for basing analyses on pixels rather than features is that problems with 'edge' pixels can be minimized (FIG. 5). This is especially important when one is attempting to identify objects in a target with the highest or lowest (spectroscopic) parameter which would be otherwise averaged-out within a merged feature.

Pedagogical Test Target

Figure 6:
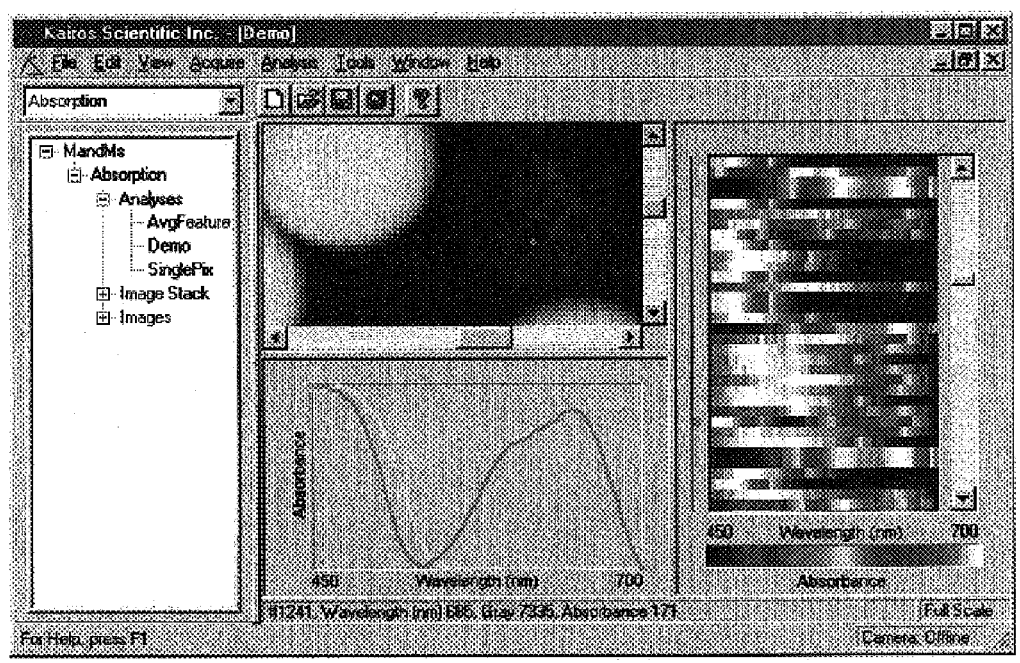
FIG. 6 shows a screen capture of a GUI, demonstrating reflectance imaging spectroscopy and single-pixel analyses of M&M candies as test targets. The four windows in this image correspond to those depicted in FIG. 1. The vertical mapping bar is depicted by the yellow and green tick mark on the left side of the contour. Since the entire contour is a single group, the vertical group selection bar is not visible. Otherwise, it would appear in a similar manner to the right of the mapping bar; on the other side of the vertical black line. Two single-pixel spectra have been highlighted for microscopic regions within a yellow and a green candy.

A pedagogical, easily recognized sample is used in this section to demonstrate various aspects of the software. FIG. 6 shows a screen capture of the GUI, wherein a plate of mini-M&M's candies (9 mm in diameter, seven colors) has been imaged in reflectance mode on a black background to create a 'stack' of images. The image window has been magnified (zoomed) so that two individual pixels falling on a yellow and on a green M&M can be more easily identified. The absorption plots corresponding to the reflectance spectra of the target area (approximately 25 microns×25 microns) under these two pixels are shown in the plot window. As can be seen in the actual spectrum, the 'yellow pixel' encodes data for a microscopic region within a single yellow M&M; its spectrum exhibits high absorbance in the blue. The 'green pixel' encodes data for a green M&M; its spectrum exhibits high absorbance in both the blue and red, with minimal absorption in the green. Both of these spectral plots are linked by the GUI to a yellow and a green tick mark to the left of the contour plot (left side of color contour plot window). Each row of the contour plot corresponds to a single-pixel absorption spectrum, which is color-encoded according to the rainbow-like color bar directly beneath. Using the row indicated by the yellow tick mark and referencing it with the yellow-colored conventional plot in the plot window, we first see (as we look from left to right in the row) white pseudocoloring of this row in the contour plot, which corresponds to high absorbance in the 450–490 nm region, then a rainbow of hues between 495–540 nm as the absorbance decreases, and finally pure black on the far right.

The GUI is highly interactive in run-time. The computer's mouse can be used to point to a pixel in the image window and thereby initiate two actions: 1) the pixel spectrum is displayed in the plot window, and 2) a tick mark appears next to the associated row in the contour window. Alternatively, pointing to a row in the contour plot causes two analogous actions: 1) the corresponding pixel is highlighted in the image window, and 2) the associated conventional plot is updated for that particular pixel. Dragging the mouse vertically over the contour plot while the mouse button is held down selects multiple rows, whose spectra are then plotted simultaneously. Likewise, dragging out a box in the image window simultaneously indicates the corresponding spectra in both the plot and contour windows. Coordinated keyboard and mouse actions can be used to make multiple selections. Once selections are made, options for color display, plot linewidth, spectral averaging, and further processing are enabled using menu, mouse and keyboard manipulations well-known to MS Windows users.

Sorting and Display of Contour Plots for a Single Group

Contour plots are very effective for visualizing and extracting useful information from massive amounts of spectral data. The concise display of data is possible because of the application of a series of sorting algorithms that group pixels with similar properties. In the case of pedagogical M&M's candies, these properties are due to visible light absorption. Aspects of this sorting process are shown below in FIG. 7. Panel A displays the desampled contour plot in a variable scale mode, wherein each spectrum has been stretched to full scale, so that each row displays absorbance intensity ranging from black to white on the absorption color-code bar. Panel B shows this same contour in a fixed-scale mode, wherein each spectrum has been normalized to the minimum and maximum absorbance values for the entire dataset. Both Panels A and B are unsorted and represent spectral information as it was initially acquired. In Panel C, we have sorted fixed-scale spectra by the maximum absorbance, so that the spectra with the highest optical density (represented by white to reddish colors) are grouped at the top of the contour plot. In Panel D, we have sorted the spectra within the contour plot by the sum-of-the-square-of-differences (SSD) using an initial yellow 'target' spectrum. A target spectrum is a spectrum that is specially chosen for the purpose of performing a comparison with other spectra. The target spectrum can be chosen from published sources (e.g., the known spectrum of chlorophyll a in ether), or alternatively, it can be selected empirically from the measurement of the material being imaged. The SSD equation is:

$$SSD = \sum_j (I_A(j) - I_B(j))^2 \qquad \text{Eqn.1}$$

Where $I_A$ represents the intensity of the spectrum A at wavelength j and $I_B$ is a target spectrum. This calculation is performed for each row in the contour plot, and the SSD values are then sorted based on their distance from the target spectrum (i.e., the relative values resulting from operation of the of the SSD equation on the function, $I_A$ that relates pixel intensity to wavelength) obtained for the data represented in each row. This creates a distance measure for each spectrum. The SSD for the intensity of the signal can be calculated at each wavelength, as in this spectral example, or the SSD for the absolute values of the intensities can be calculated at each time point for kinetics data. Thus, almost any discrete function can be used as a target 'graphic' for calculating a distance measure and sorting the data. As can be seen in Panel D, single-pixel spectra corresponding to yellow M&M's have been isolated at the top of the contour plot. In Panel E, we start with an arbitrary initial target, such as the first or topmost spectrum in the contour. Similar to the processing for Panel D, SSD values are sorted; however, this time the process is automatically reiterated with a different target spectrum for a total of (F-1) times, where F is equivalent to the number of spectra or rows in the contour. The choice of a target spectrum is discussed below.

Target Vector Selection

The software is capable of using a variety of different target vectors that can be specified by the user. There are many possible candidates for the target vector. This flexibility can be used in a reiterative method for rapid compression (requiring human intervention) or as a 'single pass' mining tool. For example, a researcher may be interested only in knowing whether certain spectral characteristics exist in an image stack. In this case, a form of target set analysis can be implemented, wherein a previously stored reference spectrum is used as the target vector. The results of the first iteration of sorting will 'mine' spectrally similar pixels into one category in the contour plot. These pixels can then be color-coded on the image and removed from subsequent sorting. In this 'sort and lock' procedure, average spectra and variances can be calculated and displayed. This process can be repeated using different target vectors until all pixels are categorized. Thus, for example, a new target spectrum can be selected by the user based on the appearance of the contour plot produced by the previous target spectrum.

In cases in which spectral components are not known, or in which single-pixel spectra contain contributions from multiple components including instrumental or lighting artifacts, a randomly generated spectrum can be used. Alternatively, the spectrum from a random pixel or feature can be selected as a first reference. This latter selection is similar to the procedure described for Panels D and E in FIG. 7. Another way to choose the target spectrum, when spectral components are not known a priori, is to use the mean spectrum in the image stack. One can also perform a pre-sort, and (based on the resultant categories) use the average spectrum of a selected category as the target (the combined average of at least two spectra). Alternatively, user-defined functions can be used as target vectors. In the case of kinetics, a linear function with a predefined slope or an exponential function may be beneficial. Although the terms spectral and kinetics are used here, it is noted that these discussions are equally applicable to both types of data.

Demonstration of Target Vector Selection and Its Use with Multiple Groups

Given the many possibilities for target vector selection, we demonstrate its application in the context of multiple groups created using the GUI. In Panel E of FIG. 7, numerous groupings and categories of spectra can be identified when the similarity sort was performed automatically with no user intervention. However, it is not apparent from this grouping how to back-paint the image so that background pixels and pixels corresponding to the seven M&M categories are clearly differentiated. User-input heuristics are important in guiding the particular series of algorithms required to sort a dataset to a level of refinement that is appropriate for backcoloring the image window.

Figure 7:
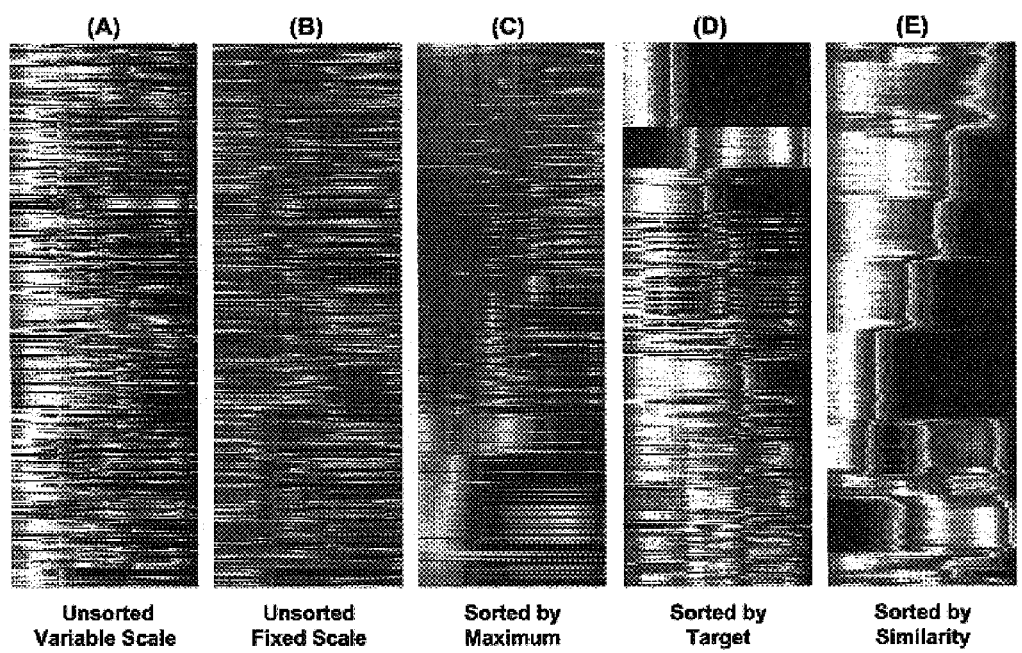
FIG. 7 shows how contour plots can be sorted to group single-pixel spectra by similarity or other criteria. Unsorted data (Panel A) can be processed to group spectra with similar attributes (Panel E). User-input heuristics is important in guiding the particular criteria (i.e., a series of algorithms) that are required to sort a dataset to a level of refinement appropriate for back-painting the image window. Additional sorting algorithms that are not shown are "Sort by channel of maximum value" and "Sort by ratio of two channels". Sorts can be performed on either variable, full-scale, or derivative data, or a combination of these.
Figure 8:
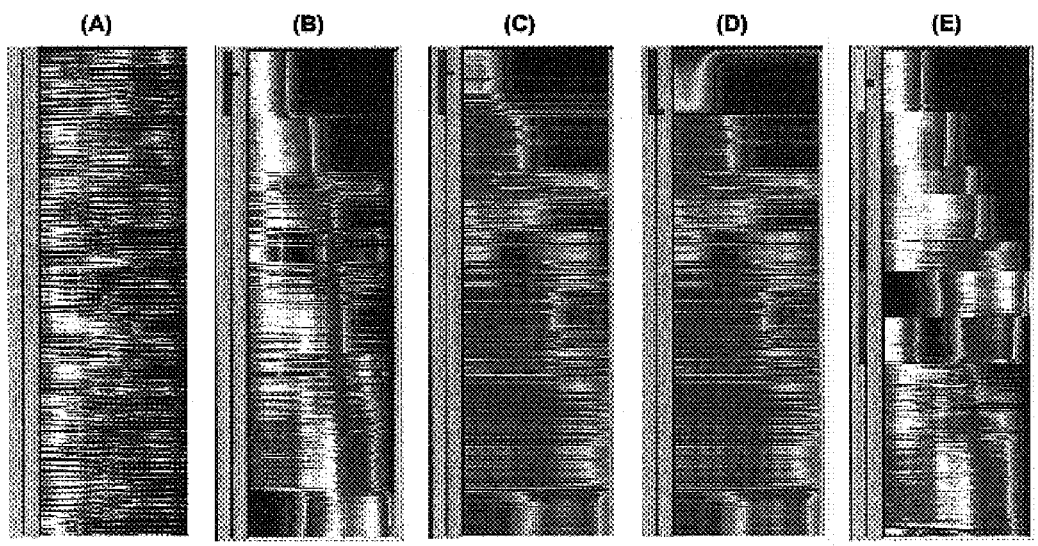
FIG. 8 shows a contour map utilizing vertical bars for grouping and mapping pseudocolors to the image window at single-pixel resolution.

FIG. 8 displays an example each of these algorithms can be used in sequence. Panels A and D from FIG. 7 are repeated in FIG. 8; however, in FIG. 8 the two vertical color bars are also shown. In Panels B–E, yellow categories of spectra have been grouped by the user. This was done by a single pass SSD sort using a yellow target spectrum, followed by user selection of rows in the contour plot which map back to the image in a logical manner. Based on a real-time mapping of pixels in the image, the user can discard rows if they map to background pixels or if they populate other M&M candies in a random, non-continuous manner. Once the rows are selected, they can be delineated as a group simply by selecting the menu item CreateGroup. When a group is created, a colored vertical bar spanning the height of the selected rows appears in the grouping bar to the left of the vertical black line. Individual rows within this group can still be independently selected and back-colored as evidenced by the small tick mark in the selection bar. Note that the contour has actually been divided into two groups in FIG. 8 Panel B: the yellow spectral group (red) and the default group (gray or not shown) which consists of the remaining rows in the contour.

Figure 9:
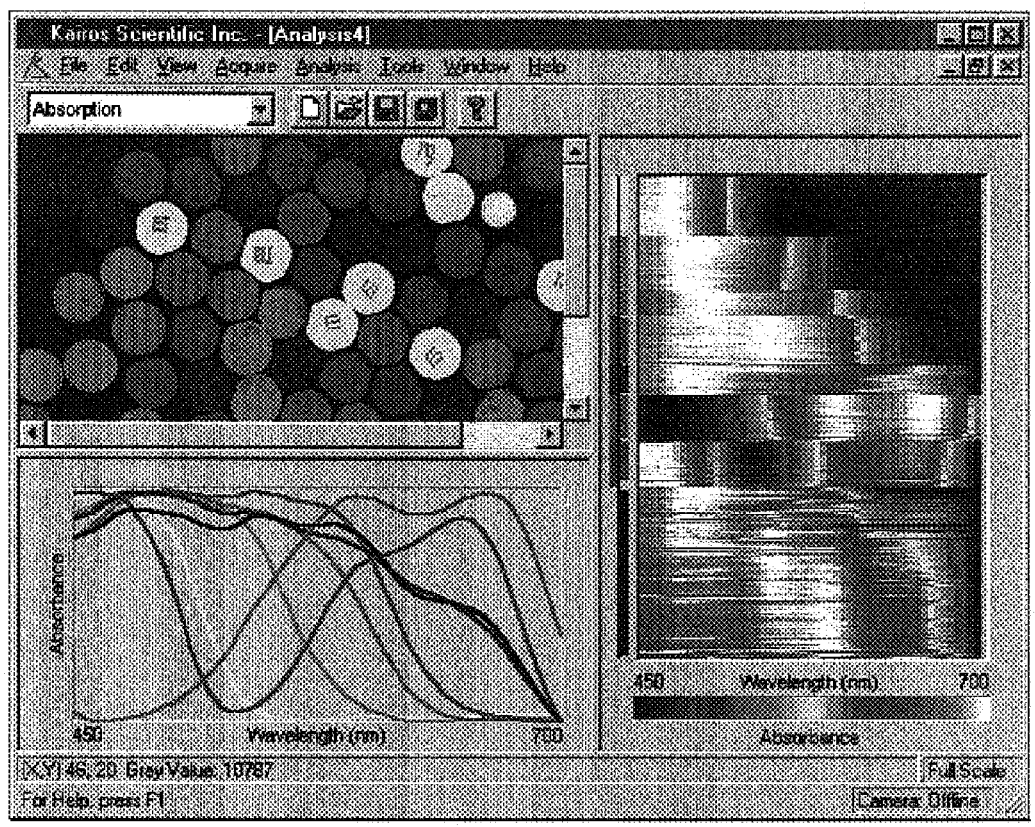
FIG. 9 shows an example of backcoloring an image of M&M candies based on spectral sorting of single-pixel data. Two vertical bars are shown. A bar immediately to the left of the contour plot is used for selection and mapping back onto the image. It uses pseudocolors approximating the real color of the candies. This color code is maintained in the plot window for each of the seven different colored candies, along with an eighth plot for the black background. Average spectra, each of which corresponds to the selected rows from the eight different groups, are plotted. All spectra are shown with full-scale (variable) deflection. Note that the letter 'M' can be distinguished in yellow M&M's. This is a result of individually sorting the yellow category spectra by the maximum intensity while in a fixed scale mode. As seen by the yellow selection bar to the left of the contour, only the upper portion of the yellow group is selected. The second vertical bar (left of the vertical black line) is the grouping bar used to delineate or segregate rows into user-defined groups of spectra or kinetics data.

The user interface is very flexible and allows for repeated individual sorting within groups. Groups can also be ungrouped, combined and regrouped as necessary to refine a given analysis. Numerous support functions for placement of a group within a contour plot are also available. Individualized group sorting is demonstrated in FIG. 8 Panels C and D, which are displayed in a variable scale mode. In Panel D, only the yellow spectral group has been sorted for maximum intensity at 475 nm. By selecting only the rows corresponding to low intensity yellow spectra (identified by tick marks in the selection bar), one can selectively identify pixels which map to the letter M on each yellow M&M candy (also see FIG. 9). FIG. 8 Panel E shows the results of sequential SSD sorting using yellow, orange, pink, red, brown, green, and blue target spectra. Thus, a plurality of target spectra can be used to organize the contour plot into multiple groups for backcoloring the image. The final color-coded analysis is shown in FIG. 9. Pixels belonging to the background have been grouped and color coded as black.

Creating an Analysis

Figure 10:
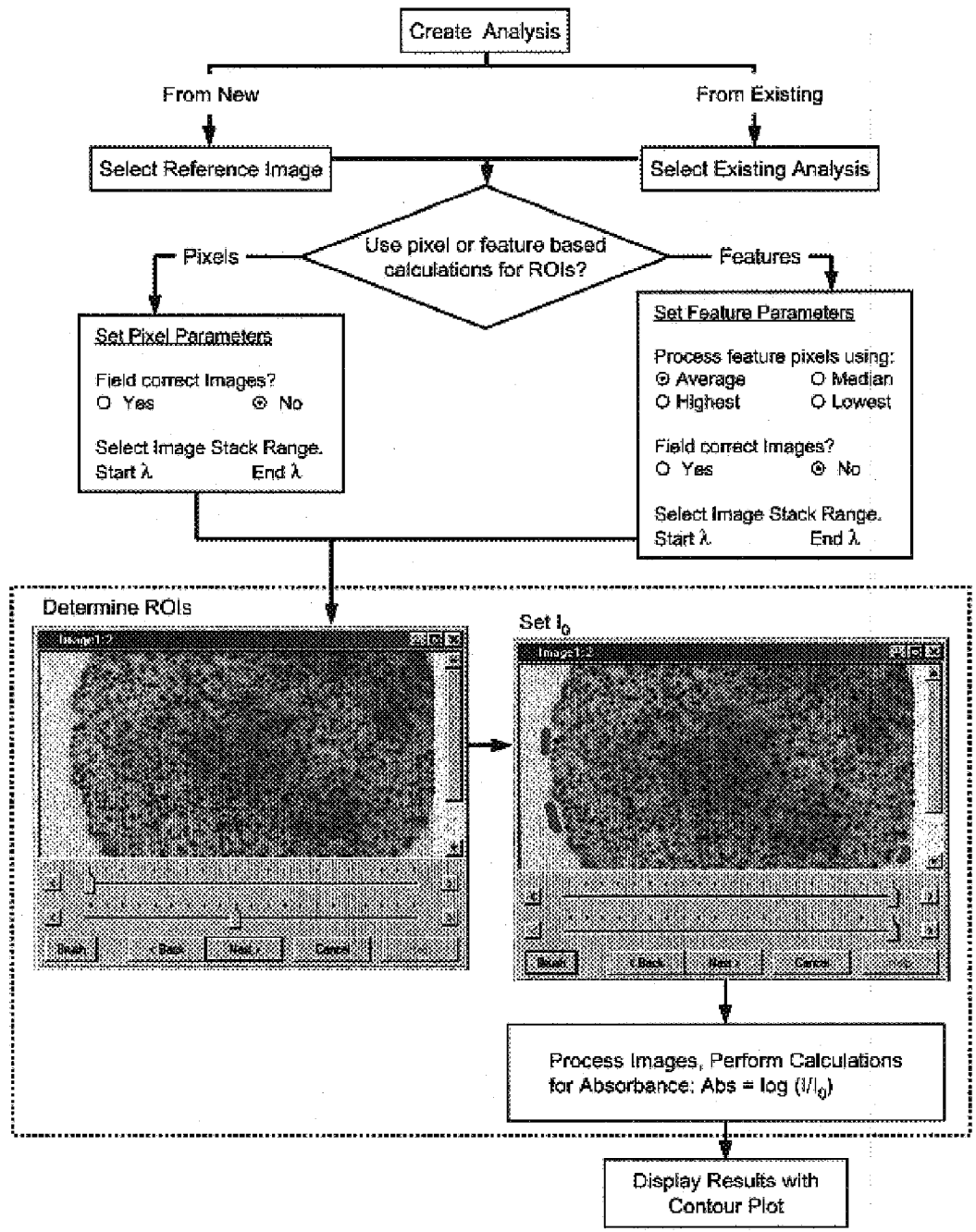
FIG. 10 shows a flowchart for creating an Absorbance analysis.

A flowchart outlining one embodiment of steps involved in creating absorbance spectra from a spectral datastack is shown in FIG. 10. A similar process can be used to calculate kinetic information from a time based datastack. Alternatives and variations of the steps enclosed in the dashed box are presented in later sections of this patent. Multiple examples of how to generate a Reference Image are also given in a later section.

The individual steps of FIG. 10 have been incorporated as a wizard in the software. Analysis information includes the regions of interest (e.g. pixels or features) and the resultant sorts of a contour plot and its groupings. This information can be saved and later applied to the same datastack or to alternative datastacks. Thus, in FIG. 10 two alternative starting paths are shown: a new analysis starting with a Reference Image or an analysis starting with previously stored information. Each starting path includes the subsequent option of using feature- or pixel-based calculations. If feature-based calculations were selected, there is the additional option of using the average, median, highest, or lowest pixel values of each feature. Other parameters include whether or not to flat field the image stack and the ability to select a subset of images in the stack for processing.

In this flowchart, ROI determination is based on contrast enhancement of the Reference Image. This is done automatically within the code using preset parameters (e.g., pixels whose values fall within the top 10% of pixel values in the image) which a user can override by dragging on the two sliderbars beneath the image. This allows one to change the respective high and low values used to determine the ROIs. Additionally, a user can paint on the image with a user defined brush size to erase and/or add ROIs. Similar functionality is enabled for identifying the $I_0$ reference in the Set $I_0$ GUI. $I_0$ pixel values are incorporated in the Beer-Lambert equation (Abs=log $I_0/I$) in order to calculate absorbances. These absorbances are then displayed within a contour plot.

Reference Image and ROI Determination

Determination of ROIs are sometimes highly correlated to the determination of the reference image. Since ROIs are determined by pixel value and heuristics such as morphology, image processing and enhancing an image using physically relevant parameters is important. Frequently, useful information is already apparent from the reference image. Therefore, the generation of a reference image can also be considered a prefiltering step which minimizes the amount of data to be processed. For example, in screening microcolonies, one does not want to compute spectra for parts of the image which do not contain microcolonies. Therefore, a reference image is used to extract only those regions in the image which do correspond to microcolonies. In certain instances, there is no single reference image from which ROIs are extracted. In this case, the reference image serves as a visual aid only and ROIs are calculated using images and parameters entered into the software. An example of this situation is given below.

In the simplest embodiment, a reference image is an unprocessed monochrome image taken at a specific timepoint under specific wavelength illumination and detection conditions. These images can also be background subtracted or flat-fielded to correct for optical and other artifacts. In all computation processes, information loss must be taken into consideration. For example, if division is used the resulting number may be very small. Therefore, integral pixel values are first converted to floating point notation prior to division and rescaled before the conversion back to integers takes place. To facilitate display, final display values are often rescaled to an eight-bit range between 0–255.

One embodiment of a reference image combines images taken at wavelengths corresponding to known spectral parameters in the sample. For example, in fluorescence and absorbance, spectral images corresponding to peak maxima or minima can be selectively combined in an arithmetic or algebraic manner. Similarly, images can be ratioed using any of a combination of wavelengths.

Another embodiment of a reference image for prefiltering uses timecourse images. If the raw timecourse datastack has already been flat-fielded by the $T_0$ image, a later timepoint image may contain kinetic data. Single timepoint images such as this are background corrected and they save feature or pixel information according to parameters set for maximum absorption, rather than maximum change of absorption over time.

When four dimensional data is available as in an RGB image, multiple channel information can be combined for a particular timepoint. This embodiment of a reference image represents the change in absorption of a target over time. An RGB image is created by subtracting an image obtained at a early time-point from an image obtained at a later timepoint. This resulting image will be black (RGB values of zero) wherever there is no increase in absorption and will be colored (positive RGB values) where increased absorption occurred over time. Another alternative is to derive the reference image by dividing one image by another. For example, a 24 minute RGB image can be divided by a 2 minute RGB image after synchronous induction of a chromogenic reaction. This method removes fluctuations in the background intensity between different images. If division is used, the program converts the individual RGB values from integers to floating point variables during the operation and re-scales the values before converting them back to integers. Otherwise, the resulting RGB values will be reduced to a narrow range, and therefore there will also be a loss of information.

Figure 11:
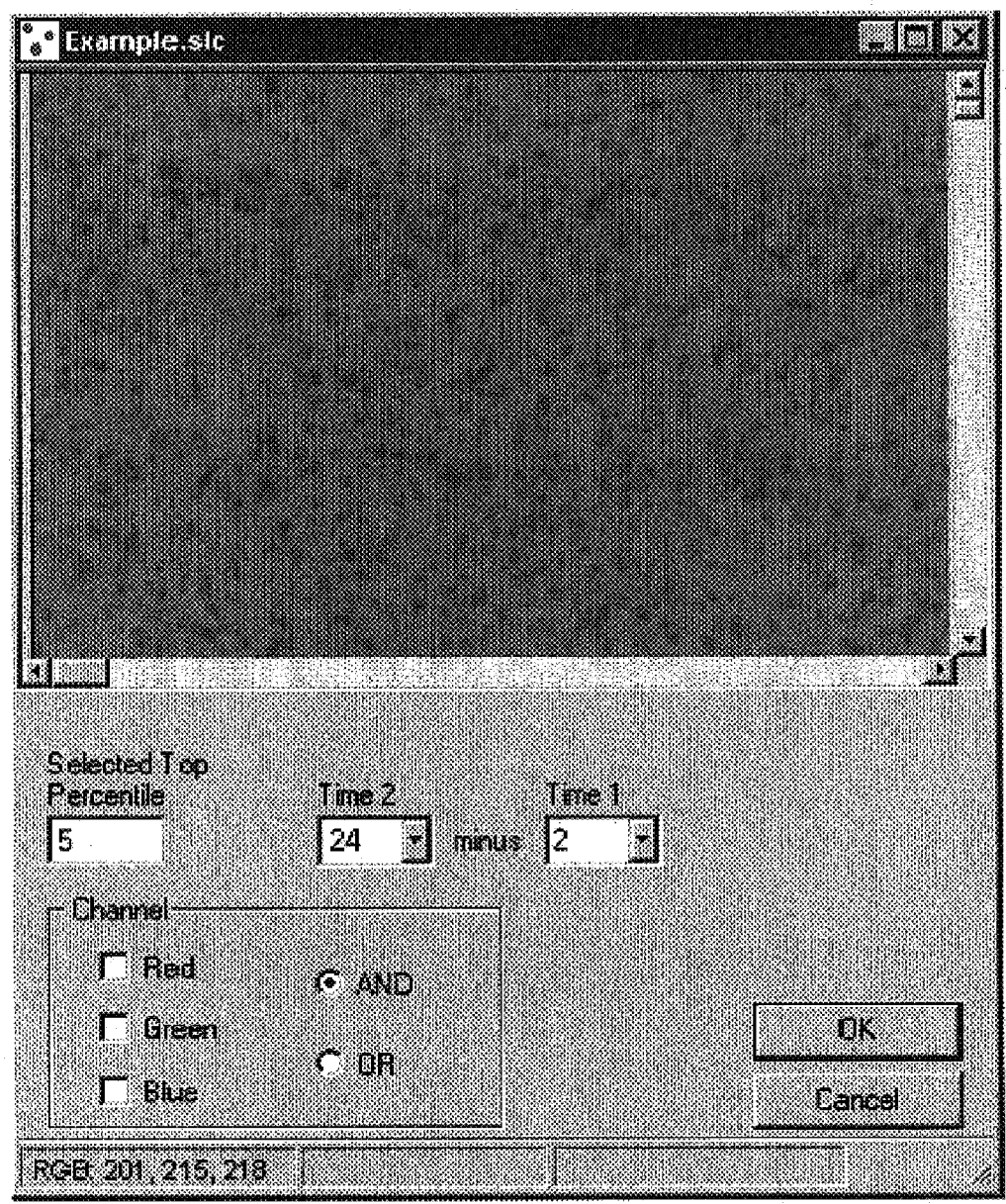
FIG. 11 shows a kinetics analysis of *E. coli* microcolonies expressing genetic variants of the enzyme Abg (*Agrobacterium* beta-glucosidase) on an assay disk. Formation of red indigo due to hydrolysis of the chromogenic substrate Red-gal indicates galactosidase activity in the microcolony. Formation of blue indigo due to hydrolysis of the chromogenic substrate X-glu indicates glucosidase activity in the microcolony. The data were recorded by an RGB camera, i.e., a linear camera or flatbed scanner such as a Hewlett Packard ScanJet 6200C. A 2-minute image has been subtracted from a 24-minute image, and the operation of selecting the top 5% of the reddest and bluest colonies (i.e., Red-gal and X-glu cleavage) is about to be applied, as shown in FIG. 12. This dialog box provides for other operations involving either AND or OR operations on the values of pixels in the red, green, and blue channels.

One embodiment of the dialog boxes in FIG. 10 is presented in FIG. 11. For demonstration purposes, three spectral wavelengths corresponding to red, green and blue in an RGB image are diagrammed. These three checkboxes can be replaced with one or more listboxes to account for additional wavelengths. Input parameters include the timepoints, the RGB colors, and the pixel value percentage which defines the pixels to be selected. In this example, two timepoint images are processed and the resultant image displayed in the dialog box. Since none of the checkboxes are marked, no pixels are selected. This image is updated in real-time when the input parameters are changed. Although subtraction is shown, any number of other operations can also be used.

Figure 12:
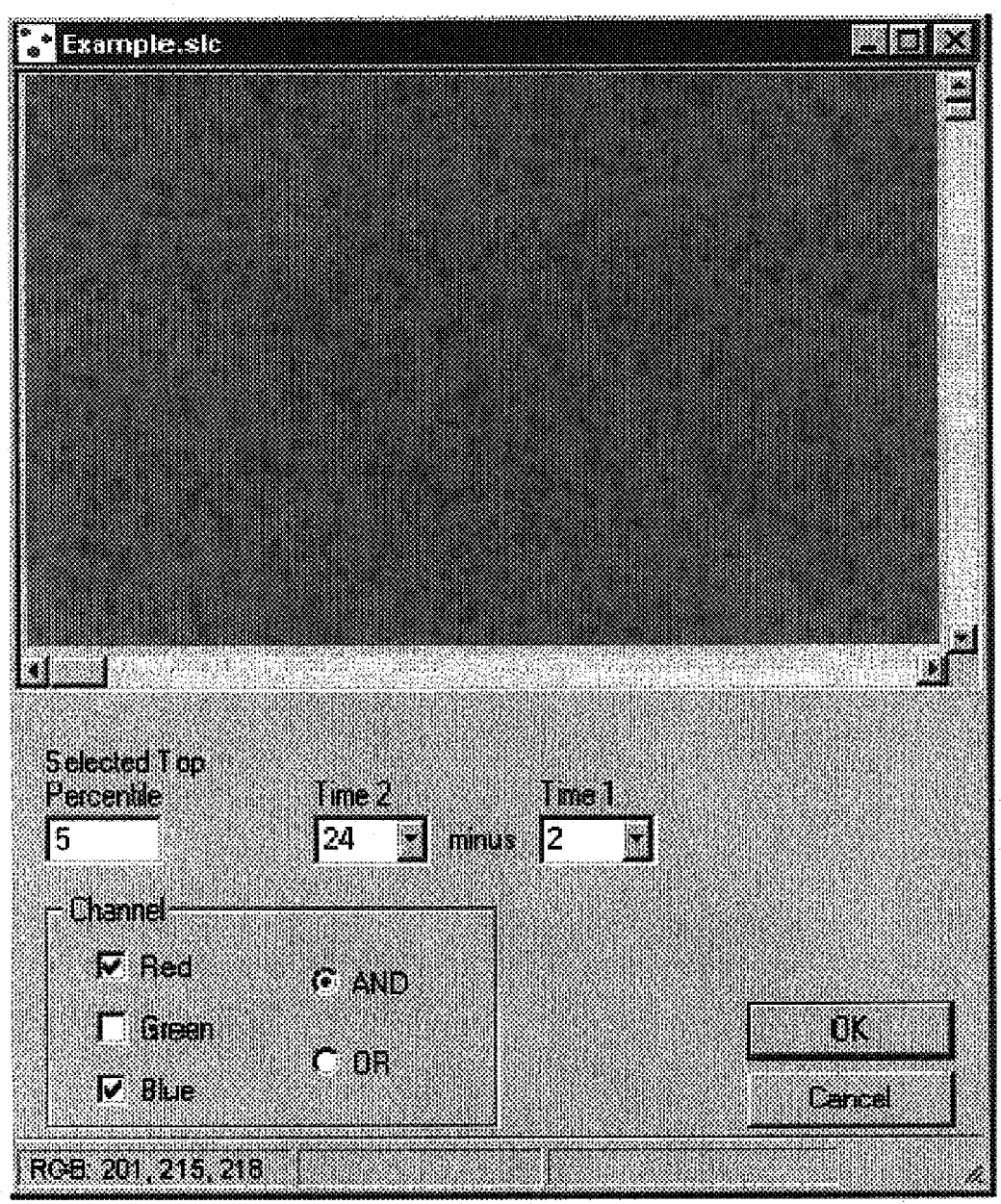
FIG. 12 shows the operation of a dialog box wherein pixels have been selected whose values in the red and blue channels are at or above the top 5% of the pixel value range in the image. These selected pixels are shown in magenta since the AND option is checked. Only these pixels and their close neighbors will be further analyzed, thus greatly reducing the amount of computation and data storage required.

Using the dialog box in FIGS. 11 and 12, selected pixels can have absorption in one or any combination of RGB channels. If pixels are to be selected that absorb in more than one channel, the "AND" option can be checked. If pixels are to be selected that absorb in any of two or more channels then the "OR" option should be checked. When a single channel is selected, the AND and OR options are grayed. As an example, if the blue and red channels are chosen with the "AND" option, then the selected pixels are pseudocolored magenta. On the other hand, if the "OR" option is used, the selected pixels are pseudocolored blue if they were selected by the 'blue' criterion and pseudocolored red if they were selected by the 'red' criterion. If a nonexclusive OR is used, then pixels meeting both criteria are colored magenta to indicate the additive color combination of red plus blue. The pixels that are selected are those with absorption in the chosen channel(s) that have pixel values at or above the percentile entered in the dialog box. Other Boolean operators that can be used in the selection of pixels include NAND and XOR that can be implemented in the software and graphical user interface so as to provide alternative means for the user to prefilter pixels. All of these algorithms involving OR, AND, NAND, NOR and other Boolean operators can be embodied in software using Microsoft MFC/C++ or alternative programming languages to create stand-alone programs. However, these algorithms can also be run on specialized boards that implement the equivalent computer code at a machine-language level as in firmware.

The updated image with selected pixels colored magenta, is shown FIG. 12. As a visual aid for the user, a monochrome image with flashing overlay pixels can also be displayed. Alternatively, the user can change to a contrast-enhance view mode wherein the RGB image is shown and the intensity values for each color can be stretched to fit any range between 0 and 255. There are other alternatives for viewing the selected pixels. For example, having the selected pixels displayed on a black or white background instead of a monochrome image indicates exactly which pixels have passed through the prefilter. Another visual tool to indicate selected pixels or features is to trace the bordering pixels of those selected such that the bordering pixels alternate in color over time.

In addition to the Boolean type processing above, multi-channel information can be evaluated by color distance criteria by formulating equations that compare the color of all of the pixels in a series of images to preselected target values. The images can be any image including one of the previously described reference images above. Using the three channel RGB system as example, a target of 200, 10, and 30, corresponding to RGB can be set. This target can be selected from the image or predefined based on previous experiments. A distance metric corresponding to the sum-of-differences between the target and each pixel's RGB value is determined and then compared to a specified cutoff value. If the distance cutoff were, for example, set to 30, a pixel with a value of 210, 19, 20 would be selected and a pixel with a value of 231, 10, 30 would be rejected. Color distance criteria also may comprise alternative equations such as the sum-of-the-square-of-the differences, i.e., an actual color distance in RGB color space.

Data Compression

While making a transition from feature to pixel processing, we saw an opportunity to contribute to hyperspectral database management after realizing that contour plots can facilitate new data compression methods. Hyperspectral information can be significantly compressed by using novel algorithms which eliminate data loss when used in the context of a client/server protocol. Based on the initial rapid preview of highly compressed data, a subsequent request for more specific information can be sent. This integrated approach to hyperspectral data management is needed in many fields where spectral datacubes are beginning to emerge as new instrumentation is developed. These fields include remote sensing and telemedicine where data is shared and transmitted to individual researchers over communication lines.

Contour plots are readily linked to data compression and take advantage of spectral heuristics, unlike common graphics image compression methods, which do not. Because image stacks are formed from grayscale 2D images, well known formats such as JPEG and GIF will either be poor at spectral compression or generate loss. These data compression methods do not take into account the relationships of information in an added dimension which can be used to enable the compression in the special cases discussed here.

Using the M&M sorting examples above, the compressed image stack can be reduced into data elements consisting of one color-coded image and the spectra and variances of each category. A stack of N images is essentially reduced into one image, a desampled contour plot, and spectral summary information. The compression factor is approximately equal to the number of images in the stack, N.

$$\text{Compression Factor} \sim N \qquad \text{Eqn. 2}$$

In cases where spectral categories are not well defined, as in the red and pink M&M's, compressed data can be supplied with the red and pink categories hypothetically grouped as one. Based on the spectra and variances also supplied, a spectral envelope and variance of these pixels can be generated and displayed in the conventional plot window of the GUI as part of the compressed data. In a mock client/server scenario, this transmitted information showing the large variance at longer wavelengths is indicative of a distribution of spectra which can be separated into more than one category. Such an initial preview of compressed information would prompt the client to request more detailed information, which can be isolated to a smaller and more specific subset of pixels.

The GUI platform described above is amenable to a 'sort and lock' procedure, which can be used to reduce computation time and facilitate compression. Multiple steps in a spectral analysis process can be performed to produce a series of contour plots, each one resulting in the identification of one or more spectral categories. Once these pixels are defined, they can be locked out and excluded from subsequent processing, thereby decreasing the number of pixels to process in the subsequent step. This 'sort and lock' procedure is presented as an alternative to an MNF transformation and end-member analyses (Green, A. A., Berman, M., Switzer, P, & Craig, M. D. (1988) A transformation for ordering multispectral data in terms of image quality with implications for noise removal: IEEE Transactions on Geoscience and Remote Sensing, v. 26, no. 1, p. 65–74.; Boardman J. W., & Kruse, F. A. (1994) Automated spectral analysis: A geologic example using AVIRIS data, north Grapevine Mountains, Nev. In: Proceedings, Tenth Thematic Conference on Geologic Remote Sensing, Environmental Research Institute of Michigan, Ann Arbor, Mich., Vol. 1, pp. 407–418) which also seek to reduce the amount of data processed. A useful method of the present invention is to sort the data in the contour plot such that they can be compressed to representative spectra.

Examples of Sorting Strategies

Figure 13:
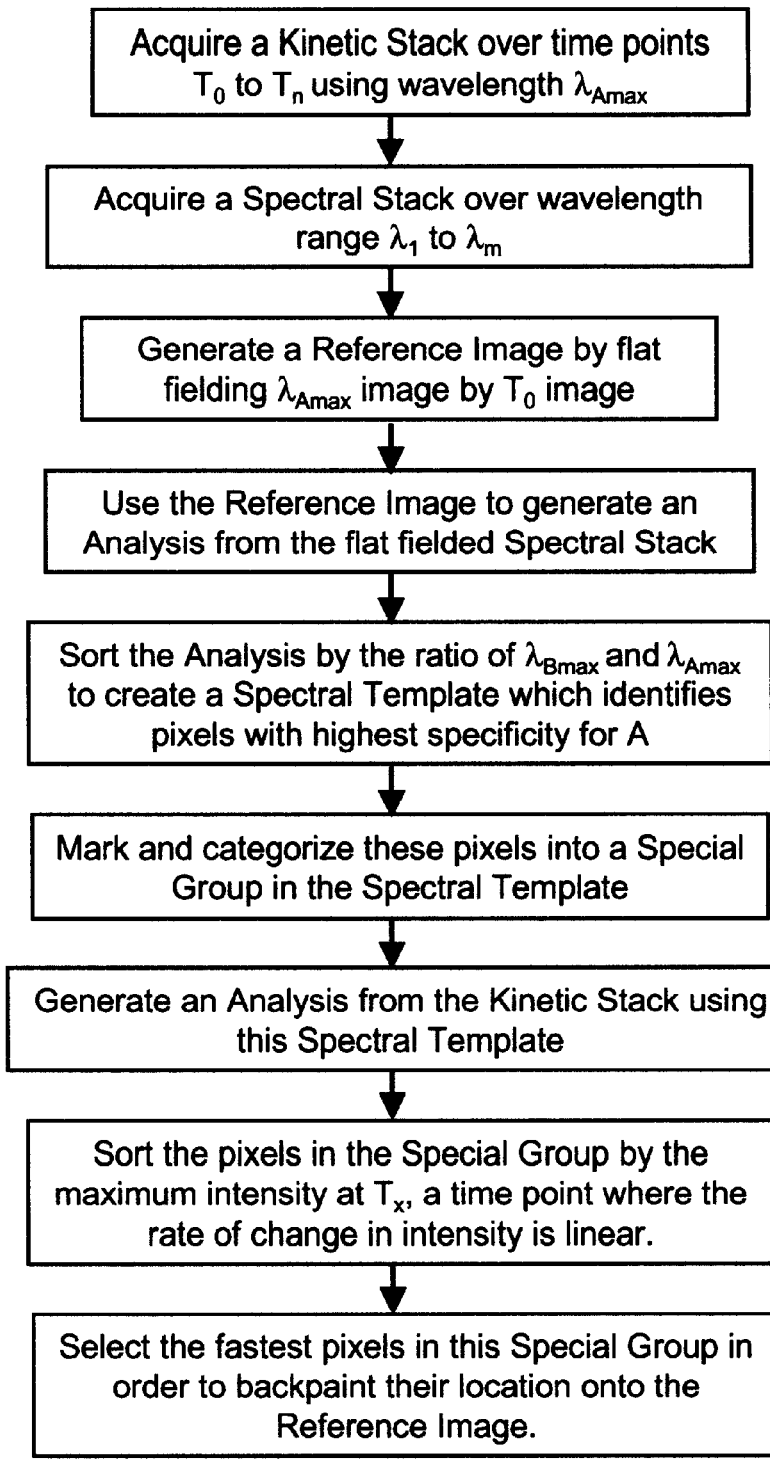
FIG. 13 shows a generalized flowchart of steps which can be used to identify enzyme variants exhibiting both the fastest kinetics and highest substrate specificity.

Here, we demonstrate a series of steps which can be used to screen a bacterial library for enzyme variants with the fastest kinetics as well as the highest specificity for a particular reaction. For example, combinatorial cassette mutagenesis has been used to generate a recombinant library of over 10 million variants of *Agrobacterium* beta-glucosidase (Abg), a sugar-cleaving enzyme. Since this enzyme has a broad substrate specificity, different substrates such as glucoside and galactoside, can be tagged with different chromogenic reporters. Experiments were conducted using two indolyl derivatives; Red-gal and X-glu. Galactoside and glucoside specificities were identified by absorbance at 540 nm and 615 nm corresponding to the $\text{lambda}_{max}$ of the respective indigo products formed from each derivative. Thus, the 'bluest' pixels would correspond to variants having the highest substrate specificity for glucoside and the 'reddest' pixels would correspond to variants having the highest substrate specificity for galactoside. In the following examples, a time-based image stack was first acquired from $T_0$ to $T_n$ corresponding to time 0 to time 2700 seconds at a wavelength of lambda=610 nm. Following this, a spectral stack was acquired over the wavelength range lambda$_f$ to lambda$_m$ corresponding to 500 nm to 700 nm. These two datastacks were stored in separate projects called Absorbance and Timecourse respectively. These examples illustrate how the images can be analyzed so that the pixels ultimately displayed are restricted by at least two independent criteria. A generalized flowchart of steps including those described in Example 1A are shown in FIG. 13.

EXAMPLE 1

In this example, an analysis was first performed using the spectral data obtained at the end of a 45 minute kinetic run to select pixels with the greatest 610 nm: 540 nm absorbance ratio. After data acquisition, the following steps were followed:

1. The 610 nm image from the Absorbance project was flat-fielded with the $T_0$ image from the Timecourse project in order to generate a reference image.

2. Using this reference image, a pixel-based spectral analysis is created. The software wizard automatically identifies pixels with grayvalues in the lowest tenth percentile. These pixels correspond to the pixels with the highest absorbances at 610 nm. As previously discussed, the user can override these automatic selections by painting on the image or redefining the high and low grayvalue range for ROIs.

3. A microcolony-free region on the edge of the membrane disk is selected for $I_0$. These values are input into the Beer-Lambert equation to calculate pixel absorbances and the intensities are then displayed in a contour plot as a function of wavelength.

4. The spectral analysis is sorted by the ratio of intensities at 540 nm and 610 nm, corresponding to the lambda$_{max}$ of the indigo products resulting from hydrolysis of Red-gal and X-glu, respectively. If the resultant sort is displayed in descending order, the 'reddest' pixels appear at the top and the 'bluest' pixels appear at the bottom of the contour plot.

Figure 14:
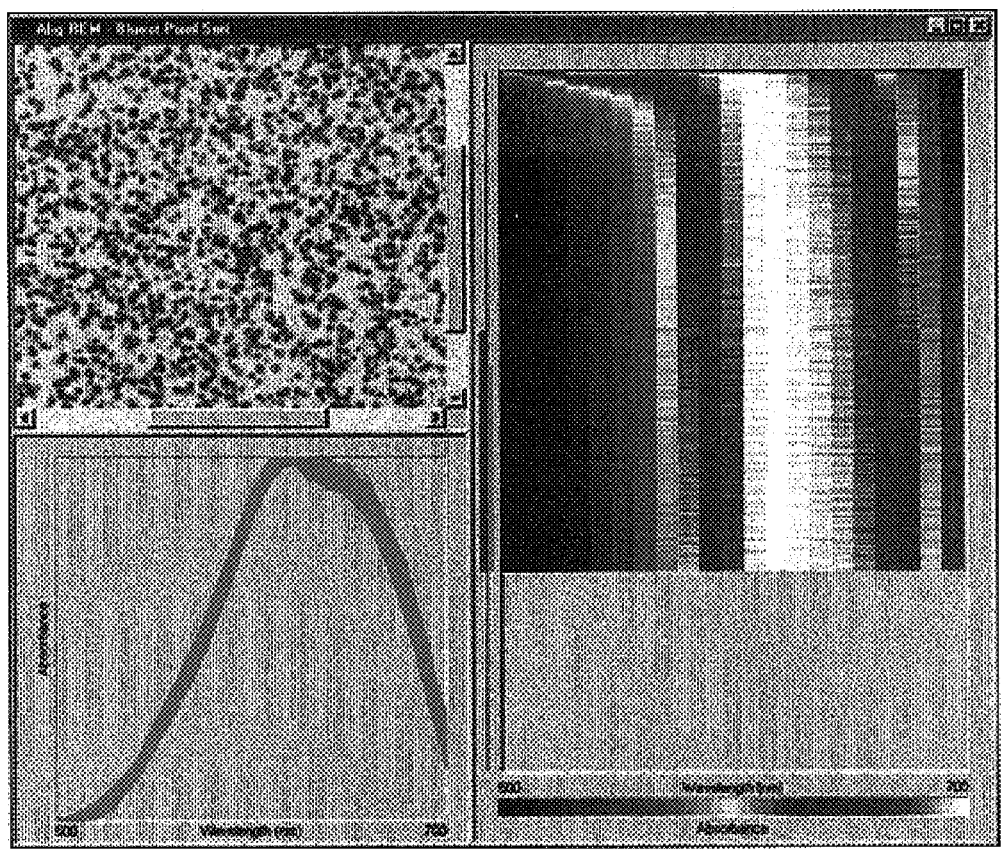
FIG. 14 shows an example of an Abg REM-bluest pixel sort displayed in the Graphical User Interface of the Kcat instrument. This experiment involves spectral analysis to assay the results of creating an Abg library using recursive ensemble mutagenesis ("REM"). Random mutagenesis creates a range of genetic variants with potentially different substrate specificities. The chromogenic substrates employed in the assay are Red-gal and X-glu. A grouping bar (red) marks the pixels with the lowest 540 nm: 610 nm absorption ratio (the bluest pixels). The selection/mapping bar (blue) indicates some of these bluest pixels. The software back-colors these selected pixels on the image in the GUI and draws out the spectral traces of each of the selected pixels in the plot window. Sorting was based on the 540 nm: 610 nm ratio. Pixels within microcolonies that favor the substrate Red-gal are sorted to the top of the contour plot and pixels within microcolonies that favor the substrate X-glu are sorted to the bottom of the contour plot.

5. The bluest pixels are marked and categorized into a new group which is identified by the red grouping bar in FIG. 14. Pixels in this select group have been backcolored onto the image in blue. Their respective absorbance plots are also shown in the plot window of FIG. 14.

6. Using the stored analysis of step 5, a new pixel-based kinetic analysis is generated in the Timecourse project. By applying this existing analysis, all of the pixels which were determined in the spectral analysis can be analyzed in this timecourse analysis. Furthermore, grouping information is maintained so that selective sorting can be performed only on pixels previously associated with the highest substrate specificity for glucoside (e.g., bluest).

7. A microcolony-free region on the edge of the membrane disk is selected for $I_0$ and parameters are set so that the images are flat-fielded with the $T_0$ image prior to the Beer-Lambert calculation. These intensities are then displayed in a contour plot as a function of time.

Since an existing analysis was used, grouping information is retained and also displayed.

Figure 15:
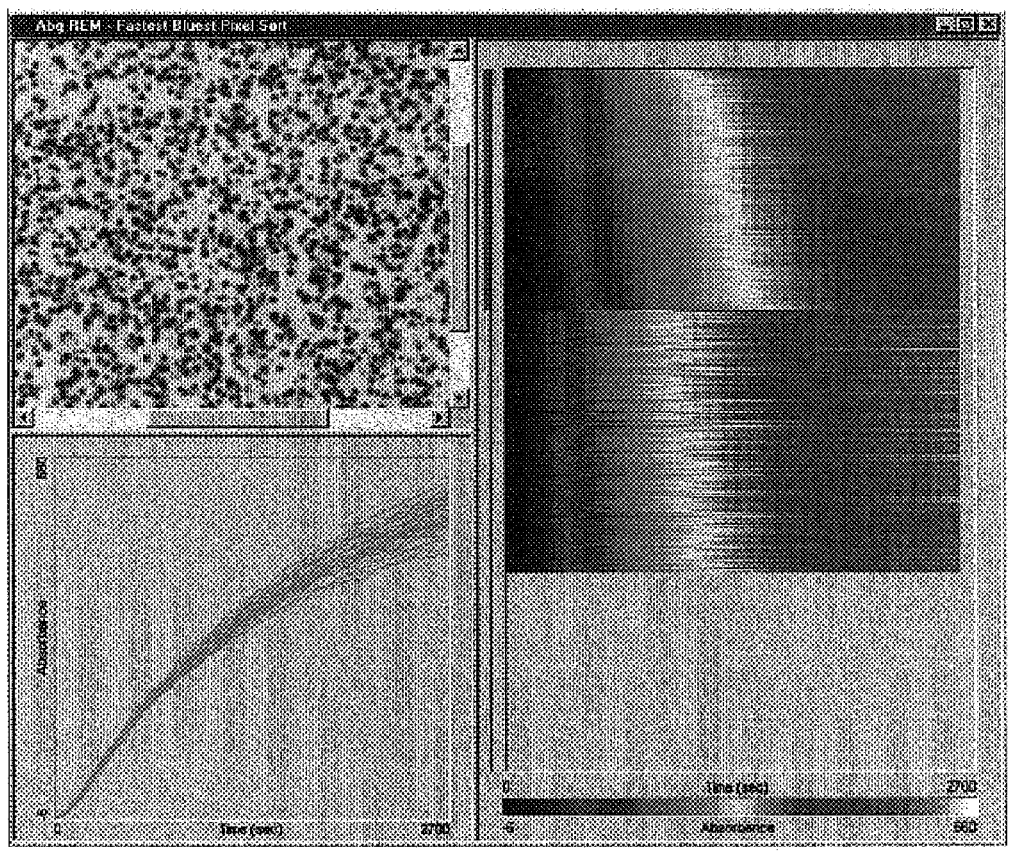
FIG. 15 shows an Abg REM—'Fastest/Bluest' Pixel Sort. The Graphical User Interface of the Kcat instrument shows the kinetic analysis of an Abg mutagenesis experiment using substrates Red-gal and X-glu. All of the pixels which were analyzed in the 'Abg REM—Bluest Pixel Sort' analysis are analyzed in this timecourse analysis. The software determines the absorbance value for each selected pixel at every timepoint and displays the resulting kinetic traces in the contour plot. A grouping bar (red) marks the kinetic plots of the pixels with the greatest 610 nm: 540 nm absorption ratio (the bluest pixels). After the 'bluest pixel' group was moved to the top of the contour plot, it was sorted by the maximum value at T=600 seconds, a timepoint where the rate of change in intensity is linear. The selection/mapping bar (blue) indicates the pixels at the top of this result. These pixels correspond to the subset of 'bluest pixels' displaying the fastest product formation. The software backcolors these selected pixels onto the image in the GUI and draws out the kinetic traces for each of the selected pixels in the plot window.

8. The previously selected group of 'bluest' pixels is moved to the top of the contour and sorted by the maximum value at T=600 seconds, a timepoint where the rate of change in intensity is linear. In order to compare relative intensities, the contour plot is displayed in a fixed scale mode. Pixels corresponding to the subset of 'bluest pixels' displaying the fastest product formation are sorted to the top. In FIG. 15, these pixels have been backcolored onto the image in blue and their respective kinetic plots are also shown.

EXAMPLE 2

In this second sorting example, an analysis was first performed using the timecourse data obtained during a 45 minute kinetic run to select pixels meeting specific temporal criteria. In other examples, this kinetic run can be longer or shorter. In this case, the temporal criterion is the fastest absorbance increase at 610 nm. The following steps were followed:

1. The T=600 second image is flat-fielded with the $T_0$ image from the Timecourse project in order to generate a reference image.

2. Using this reference image, a pixel-based kinetic analysis is created. The software wizard automatically identifies pixels with grayvalues in the lowest tenth percentile, corresponding to high absorbance at 610 nm and significant Abg-catalyzed product formation. As previously discussed, the user can override these automatic selections by painting on the image or redefining the high and low grayvalue range for ROIs.

3. A microcolony-free region on the edge of the membrane disk is selected for $I_0$. After the images in the stack are flatfielded with the $T_0$ image, pixel absorbances are calculated according to the Beer-Lambert equation and then displayed in a contour plot as a function of time.

4. In order to compare relative intensities, the contour plot is viewed in a fixed scale mode and then sorted by the maximum value at T=600 seconds; a timepoint where the rate of change in intensity is linear. Depending on the number of pixels, it may be necessary to display the contour in a desampled mode as previously described.

Figure 16:
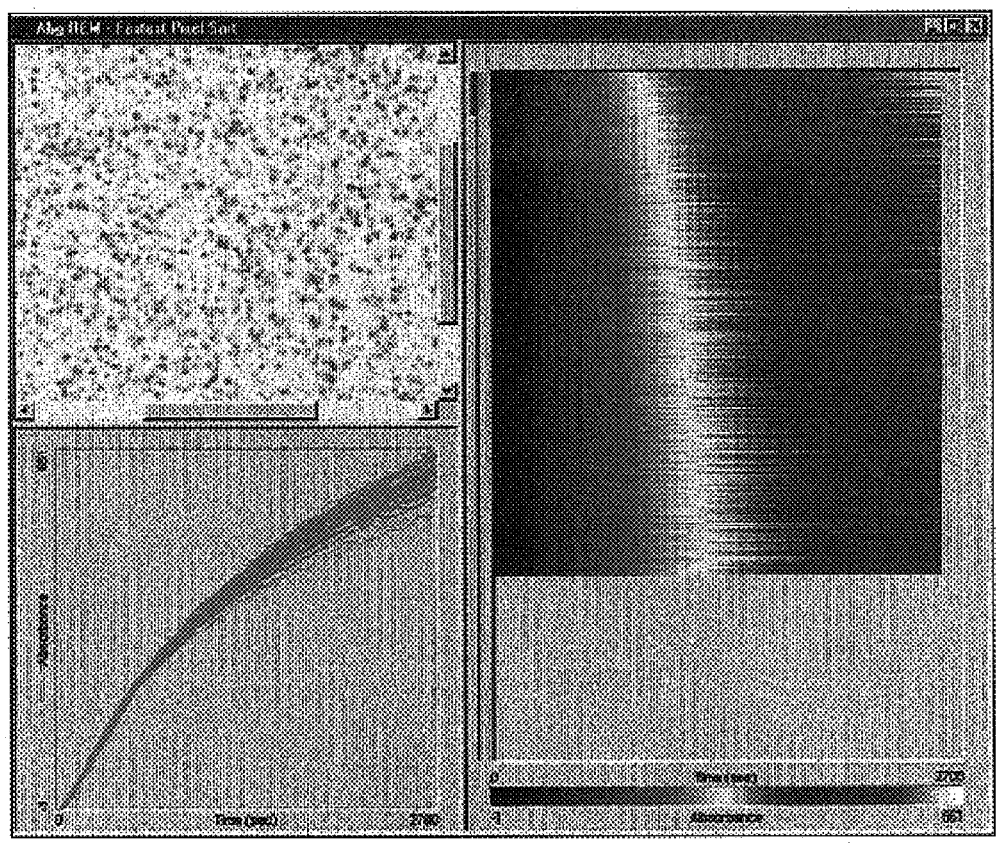
FIG. 16 shows an Abg REM—'Fastest Pixel' Sort. Graphical User Interface of the Kcat instrument shows the kinetic analysis of an Abg mutagenesis experiment using the substrates Red-gal and X-glu. An image from the absorbance datastack is flat-fielded and the darkest pixels are selected for analysis. The software determines the absorbance value for each selected pixel at every timepoint and displays the resulting kinetics in the contour plot. Pixel data was sorted by the maximum value at T=600 seconds, a timepoint where the rate of change in intensity is linear. A grouping bar (red) marks the kinetic plots of the pixels with the greatest absorbance at T=600 (the 'fastest' pixels). The selection/mapping bar (blue) indicates some of these fastest pixels. The software backcolors these selected pixels on the image in the GUI and draws out the kinetic traces of each of the selected pixels in the plot window.

5. The fastest pixels are marked and categorized into a new group which is identified by the red grouping bar in FIG. 16. Pixels in this select group have been backcolored onto the image in blue. Their respective kinetic plots are also shown in the plot window of FIG. 16.

6. Using the stored analysis of step 5, a new pixel-based absorbance analysis is generated in the Absorbance project. By applying this existing analysis, all of the pixels which were selected in the timecourse analysis can be processed in this spectral analysis. Furthermore, grouping information in the image stack is maintained so that selective sorting is performed only on pixels previously associated with the fastest rate of Abg-catalyzed product formation, as determined at time T=600 seconds.

7. A microcolony-free region on the edge of the membrane disk is selected for $I_0$ and the absorbances are calculated. These intensities are then displayed in the contour plot as a function of wavelength. Since an existing analysis was used, grouping information is retained and also displayed.

Figure 17:
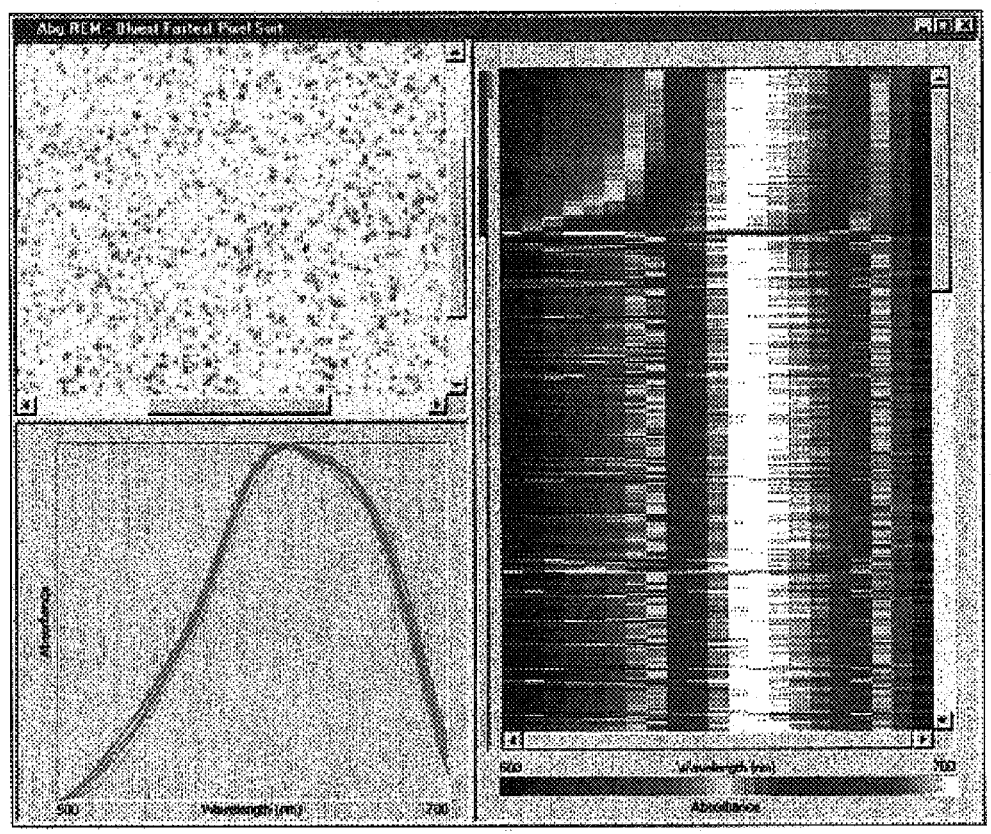
FIG. 17 shows an Abg REM—'Bluest/Fastest' Pixel Sort. The Graphical User Interface of the Kcat instrument shows the spectral analysis of an Abg mutagenesis experiment using the substrates Red-gal and X-glu. All of the pixels which were analyzed in the 'Abg REM—Fastest Pixel Sort' analysis are analyzed in this spectral analysis. The software determines the absorbance spectrum for each selected pixel and displays the resulting spectra in the contour plot. A grouping bar (red) marks the spectral plots of the pixels with the greatest absorption at T=600 seconds (the fastest pixels). This group has been subsequently sorted by the ratio of intensities at 540 nm: 610 nm. The selection/mapping bar (blue) indicates the pixels at the top of this sort. These pixels correspond to the subset of 'fastest pixels' displaying the bluest product formation. The software backcolors these selected pixels on to the image in the GUI and draws out the spectral traces of each of the selected pixels in the plot window.

8. The previously selected group of 'fastest' pixels is now sorted by the ratio of intensities at 610 nm and 540 nm corresponding to the lambda$_{max}$ of the indigo products resulting from X-glu and Red-gal, respectively. The 'bluest' pixels now appear at the top and the 'reddest' pixels appear at the bottom of the sort. In FIG. 17, a subset of 'fastest pixels' displaying the bluest product formation has been automatically indicated by backcoloring the reduced subset of pixels in the image.

EXAMPLE 3

In a third sorting example, spectral data obtained at the end of a kinetic run (or during the run) is used to determine ROIs meeting a specific spectral criteria without performing a complete contour plot based spectral analysis. This is done by generating a reference image from absorbance images as previously described. Using the Abg experiment as an example, the 610 nm image can be divided by the 540 nm image and the pixels with the lowest grayvalues would correspond to the 'bluest' pixels. If a satisfactory pixel cutoff value has been previously determined, one can use this cutoff value to select ROIs without performing the entire spectral analysis and sorting described in steps 1–5 of EXAMPLE 1 above. A single reference image based on spectral data is generated and this image is used for the kinetic analysis as listed in steps 7–8.

EXAMPLE 4

In a fourth sorting example, timecourse data is used to determine ROIs meeting a specific temporal criteria without performing a complete contour plot based kinetic analysis.

This is done by generating a reference image from timecourse images as previously described. Using the Abg experiment as an example, the T=600 second image can be flatfielded by the $T_0$ image. This would be meaningful only if it is separately determined that the timepoint selected, in this case T=600, represents a linear rate of change of product formation with time.

In this case, the pixels with the lowest grayvalues would then correspond to the 'fastest' pixels.

In this example, the entire timecourse analysis and sorting described in steps 1–5 of EXAMPLE 2 above, may not be necessary. A single reference image based on timecourse data is generated and this image is used for the spectral analysis as listed in steps 7–8.

EXAMPLE 5

Hematoxylin and eosin (H&E) stains are performed on almost all biopsied tissues before any other special stain or immunochemical analysis is considered. As a result, there are approximately 10,000 H&E stained thin sections analyzed per day in the United States. However, the staining process is difficult to control, and information obtained from a stained thin section is often based on very subtle color differences. Standardization and visual enhancement of such differences can be achieved by employing imaging spectroscopy, and this capability could benefit the entire histology community. Here we demonstrate how several of the sorting algorithms of the present invention can be used to analyze datastacks acquired by imaging a slide of H&E stained tissue.

Figure 18:
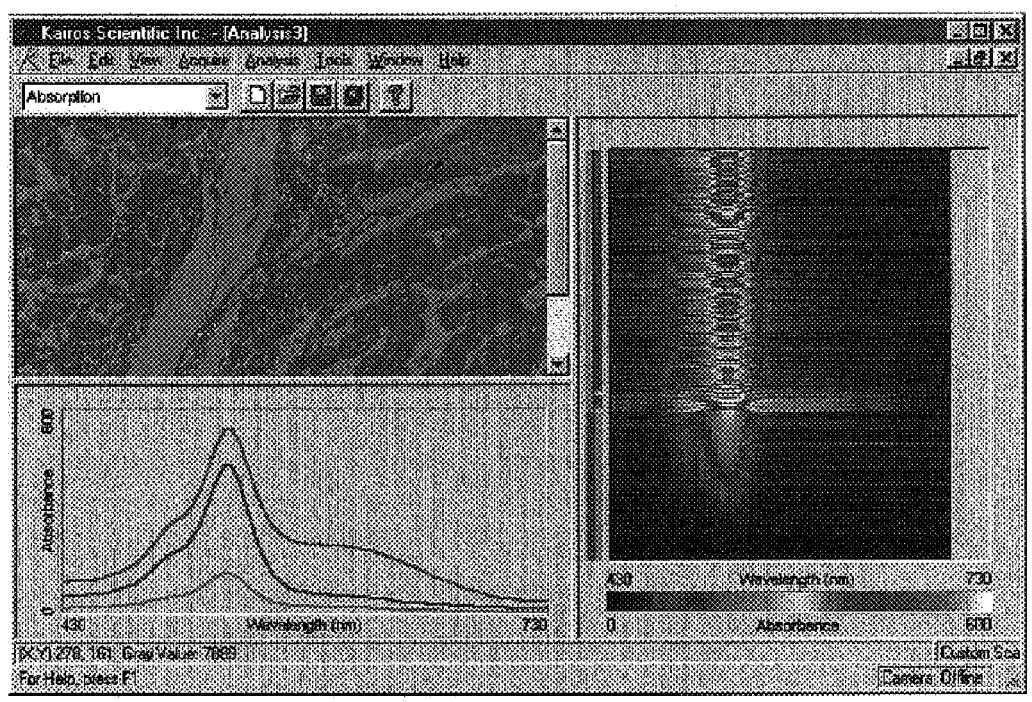
FIG. 18 shows a GUI displaying single-pixel absorption spectra from a slide of thin-sectioned tissue stained with hematoxylin and eosin (H&E). The image window shows a transverse section of cardiac tissue back-painted based on the sorted single-pixel spectra. Clear areas in the slide are sorted to the bottom of the contour plot and pseudocolored green. Pixels indicating hematoxylin absorption (610 nm) are painted blue and coincide with nuclei. Eosinophilic tissue is painted red.

FIG. 18 shows the single-pixel data obtained by acquiring an image stack of H&E stained tissue at a number of wavelengths. Eosin, which absorbs maximally between 500 nm and 550 nm, is used as a contrast stain. Hematoxylin, which is known to preferentially stain cell nuclei, contributes an additional small absorption shoulder at about 610 nm to some of the pixels. Pixels can therefore be sorted based the ratio of absorbance at 540 nm to the absorbance at 610 nm in order to automatically classify cytological features. This sorting process can be enhanced by using grouping bars.

The process begins by sorting the single-pixel spectra based on maximum absorbance value. This initial sort tends to move all of the pixels representing heavy to moderately stained regions in the image to the top of the contour plot, whereas unstained or poorly stained regions in the image are sorted to the bottom of the contour plot. By clicking and dragging a grouping bar (dark green) next to the low-absorbance pixels in the contour plot, these pixels can be locked out of the subsequent sort. A second sort is then performed on the remaining high-absorbance pixels based on the ratio of absorbance at 540 nm to the absorbance at 610 nm. Pixels having a high ratio (i.e., regions stained primarily with eosin) are thereby sorted to the top and can be grouped for further processing using the violet-colored grouping bar. Pixels having a lower ratio due to the presence of a shoulder at 610 mu (i.e., regions that have been stained with hematoxylin) are sorted beneath the high-ratio group, and fall into the middle of the contour plot. This small group of pixels can also be grouped for further processing using the light blue grouping bar.

Each of the three classes of pixels can also be selected by clicking and dragging a selection/mapping bar next to the appropriate section of the contour plot. The average spectrum for a selected group of pixels is thereby displayed in the plot window and the pixels are pseudocolored in the image window. In this example, the pixels representing low-staining or unstained regions of the tissue (the bottom third of the contour plot) have been selected by clicking and dragging a light green selection bar next to this portion of the plot. The average spectrum of these pixels is displayed in light green in the plot window, and the corresponding pixels are backcolored light green in the image window. The small number of pixels in the middle of the contour plot that represent tissue regions stained with hematoxylin have been selected with a dark blue selection/mapping bar. Their average spectrum (which has a shoulder at about 610 nm) is shown in the plot window, and the corresponding pixels are backcolored dark blue in the image window. Note that the backcolored areas for these pixels correspond predominantly to the cell nuclei. Finally, the pixels at the top of the contour plot (with absorbance primarily at 540 nm) have been selected with a red selection/mapping bar. Their average spectrum is shown in red in the plot window, and the corresponding pixels have been backcolored red in the image window. These pixels highlight areas in the tissue that have been stained primarily with eosin.

Figure 19:
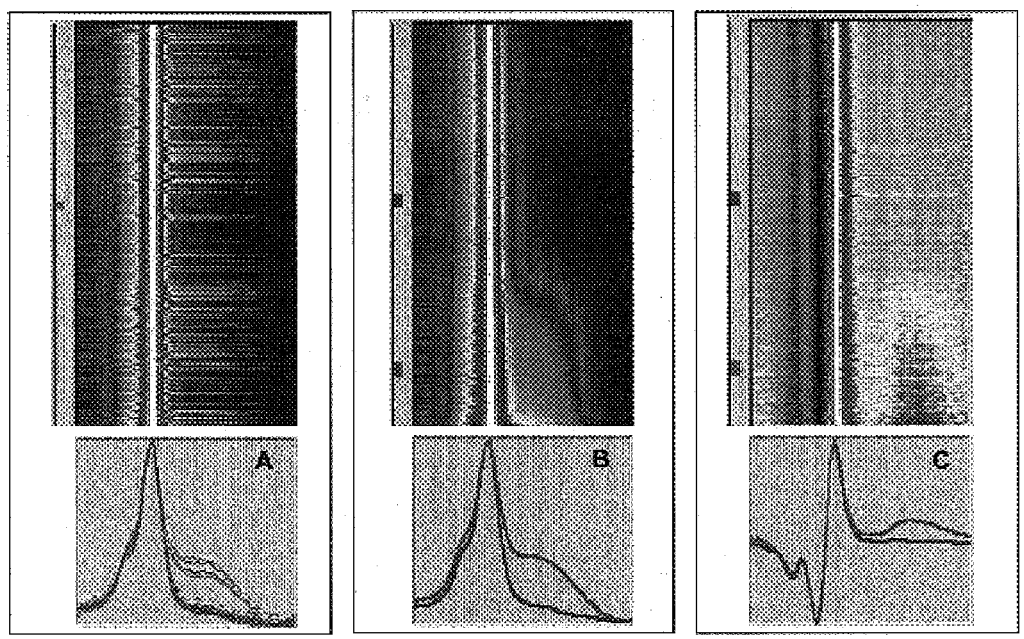
FIG. 19 shows desampled contour plots displaying single-pixel absorption spectra from a microscope slide stained with H&E. Panel A shows the initial unsorted contour plot in a variable scale mode. The plot window (A) shows single-pixel spectra corresponding to the colored tick marks in the contour plot (directly above). In Panel B, the variable scale spectra have been sorted by the ratio of optical absorbances at 540 nm compared to 610 nm. Thick blue and red lines in the plot window (B) correspond to spectral averages of pixels grouped above in the contour plot, and these are marked by blue and red bars, respectively. Panel C shows a derivative plot of these spectra with an eosin-specific inflection point at 530 nm.

FIG. 19 shows the effects of various sorting algorithms on contour plot data for H&E samples. FIG. 19 Panel A shows an unsorted contour plot in full scale mode. Several pixels have been selected from the middle of the contour plot (at the tic marks), and their spectra are displayed in the lower portion of the panel. Panel B shows the results of sorting spectra in the variable scale mode based on the ratio of optical absorbance at 540 nm compared to the absorbance at 610 nm. Pixels having spectra with a single absorption maximum at about 540 nm have been sorted to the top of the contour plot. Several of these pixels have been selected using the red selection/mapping bar, and their average spectrum is displayed in red in the lower portion of Panel B. Pixels having spectra with an absorption shoulder at about 610 nm have been sorted to the bottom of the contour plot. Several of these pixels have been selected using the blue selection/mapping bar, and their average spectrum is displayed in blue in the lower portion of Panel B. Panel C shows the results of a ratio sort of first-derivative spectra. Eosin-specific pixels having an inflection point at approximately 530 nm have been sorted to the top of the contour plot. Several of these pixels have been selected using the red selection/mapping bar, and their average first-derivative spectrum is displayed in red in the lower portion of Panel C. hematoxylin-containing pixels have been sorted to the bottom of the contour plot. Several of these pixels have been selected using the blue selection/mapping bar, and their average first-derivative spectrum is displayed in blue in the lower portion of Panel C. First-derivative analysis is useful for identifying small spectral shifts in large datasets.

What is claimed:

1. A method for analyzing digital image data, comprising:
   (a) loading into a computer memory a plurality of datastacks wherein each datastack comprises pixel intensity data for a plurality of images, the pixel intensity data expressed as a function of: (i) pixel position, (ii) a first non-positional variable, and (iii) a second non-positional variable, wherein within a datastack, the value of the first non-positional variable is not constant, and the value of the second non-positional variable is constant, and wherein between datastacks, the value of the second non-positional variable differs;
   (b) generating for a plurality of pixels within a first datastack, a plurality of first functions that relate pixel intensity to the first non-positional variable;
   (c) sorting the pixels within the first stack according to a first value obtained by applying a mathematical operation to the first functions generated for the plurality of pixels;
   (d) selecting a first set of sorted pixels;
   (e) generating for a plurality of pixels within the first set, a plurality of second functions that relate pixel intensity to the second non-positional variable; and
   (f) sorting the pixels within the first set according to a second value obtained by applying a second mathematical operation to the second functions generated for the plurality of pixels within the first set.

2. The method of claim 1, wherein the first and the second non-positional variables are selected from the group consisting of a spectral parameter, a temporal parameter, a thermal parameter, a pH parameter, a chemical activity parameter, a pressure parameter, a partial pressure parameter, and an ionic strength parameter.

3. The method of claim 1, wherein the first non-positional variable is a spectral parameter and the second non-positional variable is a temporal parameter.

4. The method of claim 3, wherein the spectral parameter is selected from the group consisting of a wavelength of light illuminating a sample from which an image is captured, and a wavelength of light selected by a spectral analyzer interposed between a sample and an image capture device.

5. The method of claim 3, wherein the spectral analyzer is selected from the group consisting of a filter, a plurality of filters, a monochromator, and an interferometer.

6. The method of claim 3, wherein the temporal parameter is proportional to the time of data capture.

7. The method of claim 1, wherein the first non-positional variable is a temporal parameter and the second non-positional variable is a spectral parameter.

8. The method of claim 7, wherein the spectral parameter is selected from the group consisting of a wavelength of light illuminating a sample from which an image is captured, and a wavelength of light selected by a spectral analyzer interposed between a sample and an image capture device.

9. The method of claim 7, wherein the spectral analyzer is selected from the group consisting of a filter, a plurality of filters, and an interferometer.

10. The method of claim 7, wherein the temporal parameter is proportional to the time of data capture.

11. The method of claim 1, wherein the first set selected in step (d) is a subset of the pixels sorted in step (c).

12. The method of claim 1, wherein said first mathematical operation comprises a step selected from the group consisting of calculating the first function maximum, calculating the first function minimum, calculating a ratio of values within the first function, calculating a value of the first function at a predetermined time point, and calculating a distance between the first function and a target function.

13. The method of claim 12, wherein the target function is a target spectrum.

14. The method of claim 13, wherein the target spectrum is calculated from data within one or more datastacks.

15. The method of claim 13, wherein the target spectrum is the spectrum of a pixel selected by a user.

16. The method of claim 1, wherein said second mathematical operation comprises a step selected from the group consisting of calculating the second function maximum, calculating the second function minimum, calculating a ratio of values within the second function, calculating a value of the second function at a predetermined time point, and calculating a distance between the second function and a target function.

17. The method of claim 16, wherein the target function is a target spectrum.

18. The method of claim 17, wherein the target spectrum is calculated from data within one or more datastacks.

19. The method of claim 17, wherein the target spectrum is the spectrum of a pixel selected by a user.

20. The method of claim 1, wherein the results of sorting step (c) are displayed on a computer monitor prior to said selecting step (d).

21. The method of claim 1, wherein the results of sorting step (f) are displayed on a computer monitor.

22. The method of claim 1, wherein said datastacks comprise data selected from the group consisting of temporal changes in fluorescence signals, temporal changes in FRET signals, temporal changes in reflectance signals, temporal changes in absorption signals, fluorescence spectra, FRET spectra, reflectance spectra and absorption spectra.

* * * * *